Oct. 21, 1952 W. H. V. CLARKE ET AL 2,614,900

RECORDING INSTRUMENT AND EQUIPMENT

Filed Feb. 16, 1949 19 Sheets-Sheet 1

Inventors
William H.V. Clarke
Thomas S. Parramore
By Ralph B. Stewart
Attorney

Oct. 21, 1952 W. H. V. CLARKE ET AL 2,614,900

RECORDING INSTRUMENT AND EQUIPMENT

Filed Feb. 16, 1949 19 Sheets-Sheet 2

Inventors
William H.V. Clarke
Thomas S. Parramore
By Ralph B. Stewart
Attorney

Inventors
William H. V. Clarke
Thomas S. Parramore
By Ralph B. Stewart
Attorney

Inventors
William H. V. Clarke
Thomas S. Parramore
By Ralph B. Stewart
Attorney

Inventors
William H.V. Clarke
Thomas S. Parramore
By Ralph B. Stewart
Attorney

Inventors
William H. V. Clarke
Thomas S. Parramore
By Ralph B. Stewart
Attorney

Inventors
William H.V. Clarke
Thomas S. Parramore
By Ralph B. Stewart Attorney

Oct. 21, 1952 W. H. V. CLARKE ET AL 2,614,900

RECORDING INSTRUMENT AND EQUIPMENT

Filed Feb. 16, 1949 19 Sheets-Sheet 8

Inventors
W. H. V. Clarke
T. S. Parramore
By Ralph B. Stewart
Attorney

Inventors
William H. V. Clarke
Thomas S. Parramore
By Ralph B. Stewart
Attorney

Inventors
William H. V. Clarke
Thomas S. Parramore
By Ralph B. Stewart
Attorney

Inventors
William H. V. Clarke
Thomas S. Parramore
By Ralph B. Stewart
Attorney

Inventors
William H. V. Clarke
Thomas S. Parramore
By Ralph B. Stewart
Attorney

Inventors
William H. V. Clarke
Thomas S. Parramore
By Ralph B. Stewart
Attorney

Inventors
William H. V. Clarke
Thomas S. Parramore
By Ralph B. Stewart
Attorney

Inventors
William H. V. Clarke
Thomas S. Parramore
By Ralph B. Stewart
Attorney

Inventors
William H.V. Clarke
Thomas S. Parramore
By Ralph B. Stewart
Attorney

Inventors
William H. V. Clarke
Thomas S. Parramore
By Ralph B. Stewart
Attorney

Inventors
William H. V. Clarke
Thomas S. Parramore
By Ralph B. Stewart
Attorney

Oct. 21, 1952 W. H. V. CLARKE ET AL 2,614,900

RECORDING INSTRUMENT AND EQUIPMENT

Filed Feb. 16, 1949 19 Sheets-Sheet 19

Inventors
William H. V. Clarke
Thomas S. Parramore
By Ralph B. Stewart
Attorney

Patented Oct. 21, 1952

2,614,900

UNITED STATES PATENT OFFICE 2,614,900

RECORDING INSTRUMENT AND EQUIPMENT

William Herbert Victor Clarke, Bournemouth, and Thomas Stuart Parramore, West Malling, England, assignors to Airspeed Limited, Portsmouth, England, a company of Great Britain Application February 16, 1949, Serial No. 76,682
In Great Britain February 16, 1948

14 Claims. (Cl. 346—34)

This invention relates to recording instruments and equipment and particularly to multiple recorders which enable a considerable number of instrument readings to be recorded in rapid succession, the whole recording operation being largely automatic.

A familiar type of recording instrument has a stylus which is attached to an instrument movement so that it is moved across a graduated chart material according to the instrument reading and the chart material is moved continuously past the stylus to give a continuous line on the chart which rises or falls according to the recorded value at any instant during the recording operation.

A recording instrument according to the present invention differs fundamentally from the type described above in that the stylus is traversed independently across the chart material and, in the simplest form of the instrument, makes only a single record point during each traverse, the position of the recorded point indicating the magnitude of a recorded quantity. Alternatively, the stylus may be caused to record a number of points in each traverse to indicate the magnitudes of a number of recorded quantities.

According to the present invention, a recording instrument has a display board or other surface adapted to receive a chart material or a similar recording surface and a stylus which is arranged to traverse the recording surface and to make a record mark at a point whose position along the path of traverse of the stylus indicates the magnitude of the quantity to be recorded.

After a first traverse, the stylus may be moved relatively to the chart material and caused to traverse the recording surface along other paths which are progressively displaced along the chart material. In this way, a number of discrete record marks are made showing the variation in magnitude of the recorded quantity at the times of the successive traverses. A graph, made up of the separate points, is in this manner recorded on the chart material.

If, as is preferred, the traverse of the stylus and the displacement of the chart material are at right angles, the graphs so formed will indicate the variation of the recorded quantity with time, or with any dependent variable, against rectangular co-ordinates.

The preferred form of the invention is concerned with the special problem which arises when a large number of records have to be taken and this form of the invention has been successfully applied to recording readings of a large number of strain gauges set up on a stressed structure such as an aircraft wing.

For such purposes, the area of the recording surface is divided transversely into a number of zones, each zone extending throughout the effective length of the recording surface, and each zone being divided longitudinally into sections of equal length, the sections in different zones being arranged in rows transversely of the zones. In its traverse, the stylus makes a record mark in each of the zones in succession and the positions of the marks relative to the limits of the corresponding zones indicate the magnitudes of a number of quantities recorded in succession.

To this end, the stylus is mounted on a carriage which is driven forwards continuously along the recording surface during a recording operation and the stylus is moved relatively to the carriage, transversely of the recording surface with a component of motion equal and opposite to the forward motion of the carriage, so that the resultant direction of the stylus movement is perpendicular to the direction of the carriage movement. Thus the carriage movement may bring a stylus into position for a subsequent traverse and the separate points constituting a single graph are then displaced by the distance of the carriage movement during each traverse.

However, it is preferred to move the recording surface relatively to the stylus under manual control to give the required separation of the separate record marks and, in this arrangement, the movement of the carriage is made sufficient to bring the stylus into the next row of sections along the length of the recording surface ready for its next traverse. In this way a large number, up to some hundreds, or sections may be accommodated in rows along the recording surface on a single sheet of chart material.

The recording technique employed, in the example instanced, is to connect the stylus to each of a large number of instruments in succession both as the stylus traverses the width of the chart material and as the carriage moves along the length of the chart material. In this way a single series of record marks is made, one in each section recording the value of each of the instruments in succession.

After this first recording operation, the test conditions are varied, the chart material is moved longitudinally a short distance under manual control and the recording operation is repeated. This provides a second series of record marks showing the variation in reading of each of the instruments. The process is then repeated any required number of times and provides ultimately a series of graphs, one in each zone, showing the variation of the instrument readings with the progressive variation of test conditions.

A recording instrument according to the invention preferably has a framework and a display board mounted on the framework. The display board can be moved within the length of a zone relatively to the framework under a manual control. A carriage is mounted on the framework and is adapted to be driven forwards continuously along the framework carrying a stylus which, as stated, is traversed across the display board perpendicularly to the direction of the carriage movement. The chart material is conveniently secured by clamps arranged at each end of the board and extending from edge to edge of the chart material and the display board may be extensible longitudinally so that the chart material can be rendered taut.

Preferably the chart material is an electrolytic recording paper and a suitable recording potential is applied to the recording stylus at the instant when a record mark is made.

The carriage may carry an endless roller chain in which a number of styli are mounted in insulating bushes inserted in hollow rivets arranged at spaced positions along the chain. The styli are then normally partially withdrawn from the insulating bushes and each stylus is moved forward by a ramp on a conducting pressure plate to make contact with the recording paper during its traverse of the recording surface. At the end of the traverse each stylus is withdrawn by a magnet arranged on the carriage adjacent the edge of the recording paper and acting on a head of magnetic material provided on each stylus.

A number of other refinements are desirable in a practical recording instrument and such features will be apparent from the description of a preferred form of the invention which is given below.

The following example of a recorder according to the invention is an instrument which has been used successfully for measuring the condition of a large number of resistance type strain gauges, up to some two hundred, attached at various points on the surface of a structure such as an aircraft wing, which is progressively stressed between successive recording operations to obtain a record of the strain to stress relationship in the various parts of the structure.

It will assist in the understanding of the earlier parts of the detailed description of this example which follows, if certain of the general features of the instrument are carried in mind.

The recorder consists of a vertical framework on which a display board is mounted vertically and is manually adjustable longitudinally relatively to the framework. A recorder carriage is mounted on the framework and driven continuously from left to right of the display board during a recording operation. The display board has a conducting front surface on which is supported a sheet of electrolytic recording paper. A record mark is made on the recording paper by passing an electric current pulse through a stylus. The surface of the recording paper is divided into sections in vertical and horizontal rows, one section being provided for each of the strain gauges. The rows of sections extending along the length of the recording surface are referred to as zones.

The recorder carriage is provided with an endless roller chain carrying three styli at equally spaced intervals along its length and the chain is driven through gearing from the carriage drive. As the carriage moves over the display board, first one stylus and then the next is moved vertically over the surface of the electrolytic paper and five record marks are made in each traverse, one in each of five sections arranged in a vertical column and located in five different zones. The longitudinal traverse of the carriage brings the next stylus into position to traverse in the sections in the adjacent right hand column and a further five record marks are made. This process is continued during the whole traverse of the carriage in one recording operation.

After a first longitudinal traverse, the recorder carriage is returned to its left-hand starting position. The whole display board is moved manually a short distance to the left relatively to the framework. The stress applied to the aircraft wing or other structure is changed as required and the recorder carriage is set in motion for a second traverse along the framework.

In this second recording operation, a second series of record marks are made, each record mark being displaced longitudinally of the first series of marks by the distance through which the display board was moved manually. This distance is a small fraction of the length of a section of the recording surface. By repeating the recording operations, a series of graphs showing the strain to stress relationship for each of the strain gauges used and arranged in vertical and horizontal rows is finally obtained on the recording paper. One margin or edge of each zone of sections constitutes a reference axis from which each record mark in the zone is displaced laterally a distance proportional to the value of the quantity being recorded.

Each strain gauge is connected in a Wheatstone bridge network with a corresponding reference strain gauge and with two resistance arms which are connected by an automatic switching arrangement to each of the strain gauge pairs as required. The strain gauges are selected in sequence as the recording stylus moves into the corresponding zones on the recording paper.

The strain gauge bridges are balanced automatically in succession during the recording operation and an electronic circuit provides a current pulse through the operative stylus in each zone in succession at the instant when the corresponding strain gauge bridge is balanced.

A detailed description of the recorder will be given with reference to the accompanying drawings of which:

Figure 1:
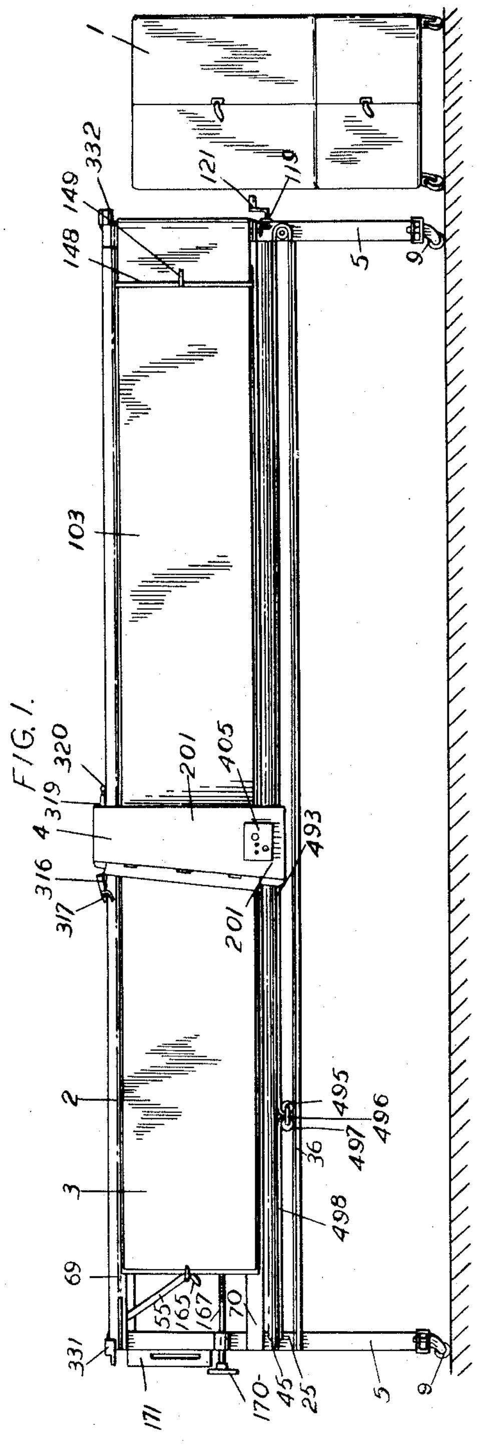
Figure 1 is a general front elevation view of the recorder and associated control cabinet.
Figure 32:
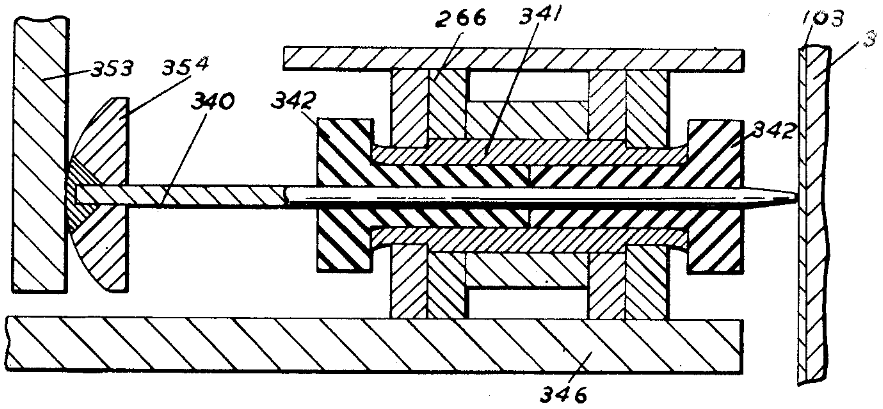
Figure 32 is a section on the line XXXII—XXXII of Figure 31 showing the details of the stylus mounting.

As shown in Figure 1, the recorder consists, in its essentials of a control cabinet 1, a horizontal framework 2, a display board 3, and a carriage 4, which is driven over the surface of the display board 3 and carries a number of recording styli which are shown in detail in Figure 32.

Figures 2, 3, 4:
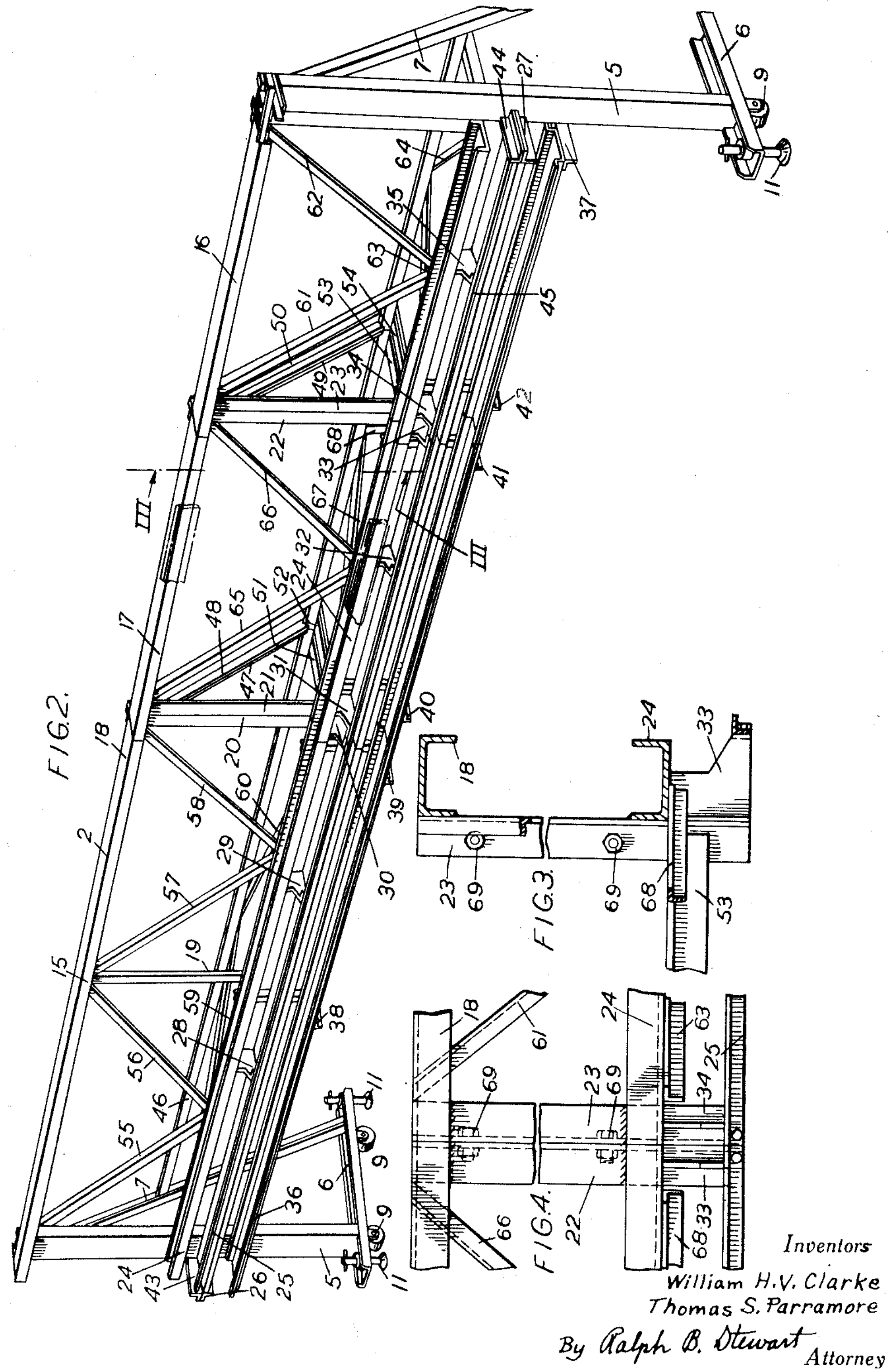
Figure 2 is a perspective view of the recorder framework.
Figure 3 is a section on the line III—III of Figure 2.
Figure 4 is a front elevation detail view showing the junction of two adjacent sections of the recorder framework.

Referring to Figure 2, it will be seen that the framework 2 is mounted on vertical end supports 5, each having at its lower extremity a channel section base member 6, running from front to back of the framework and to which the uprights 5 are braced by the inclined members 7. The base member 6 is mounted on casters 9 and is provided at each end with screw down feet 11. The casters enable the whole recorder to move about as necessary, and then rigidly set up in a required working position by screwing down the screw feet 11.

The framework comprises three sections, an end-section 15 which is attached to the lefthand upright 5, an end-section 16 which is attached to the right hand upright 5, and a mid-section 17 which is held intermediate of the end-sections 15 and 16.

The framework is constructed so that the mid-section 17 may be removed and the sections 15 and 16 joined together or both the sections 16 and 17 removed and the section 15 joined directly to the right hand upright 5, in order to reduce the working length of the recorder surface.

Alternatively, any required number of mid-sections similar to that shown at 17 may be mounted between the end-sections 15 and 16, in order to increase the working length of the recorder surface.

The framework 2 is made up of a number of continuous members running from end to end of the framework and made up of corresponding parts in each of the sections 15, 16, and 17. For this reason the members are equivalent to a continuous member, and are not separately numbered for each of the sections 15, 16 and 17.

These parts consist of an upper longitudinal member 18 of inverted channel section, secured by its back wall to the end uprights 5, and to intermediate uprights 19, 20, 21, 22 and 23. A lower longitudinal member 24, of similar channel section, is secured by its back wall at approximately mid-height of the uprights 5 and near the lower ends of the intermediate uprights 19 to 23.

Below the member 24 is a horizontal shelf 25, secured to the uprights 3 and 4 by brackets 26 and 27 respectively, and held intermediately by the brackets 28, 29, 30, 31, 32, 33, 34 and 35. Below the shelf 25 is a cable conduit 36 consisting of an upturned channel member having its side walls turned over into the horizontal plane. The cable conduit 36 is supported from the uprights 5 by forwardly projecting brackets, one of which is shown at 37, and by intermediate brackets 38, 39, 40, 41 and 42.

Fixed to the uprights 5 and to the brackets 26 and 27, are a pair of brackets 43 and 44 which carry a narrow longitudinal member 45 of angle section, upon which rests a roller chain, to be described later with reference to Figure 11.

The framework is braced by a rear member 46 extending between the bracing members 7. Parallel to the members 7 are arranged intermediate bracing members 47, 48, 49 and 50, extending to the member 46 from the uprights 20, 21, 22 and 23 respectively. The rear member 46 is also held to the vertical part of the framework by backwardly extending members 51, 52, 53 and 54 attached to the uprights 20, 21, 22 and 23 respectively.

The section 15 has diagonal bracing members 55, 56, 57 and 58 between the uprights 5, 19, and 20, respectively, and is provided with two backwardly extending diagonal members 59 and 60 which extend from the vertical part of the framework to the rear member 46. The right hand section 16 is provided with diagonal members 61 and 62, arranged in the vertical plane and diagonal members 63 and 64 in the horizontal plane.

The midsection 17 is similarly provided with diagonal members 65, 66 in the vertical plane and 67 and 68 in the horizontal plane.

It will be appreciated that to make up the complete framework the adjacent members of the sections 15, 16 and 17 are secured together to make a single rigid structure and Figure 3, which is an end view along the section line III and Figure 4, show the manner in which the vertical members 22 and 23 are joined together by transverse bolts 69.

When the various parts of the framework are secured together, the longitudinal members such as the members 18 and 24, the shelf 25 and the conduit 36 abut end to end, section for section, each to provide a continuous member extending the whole length of the recorder framework 2.

Figures 5, 6, 7:
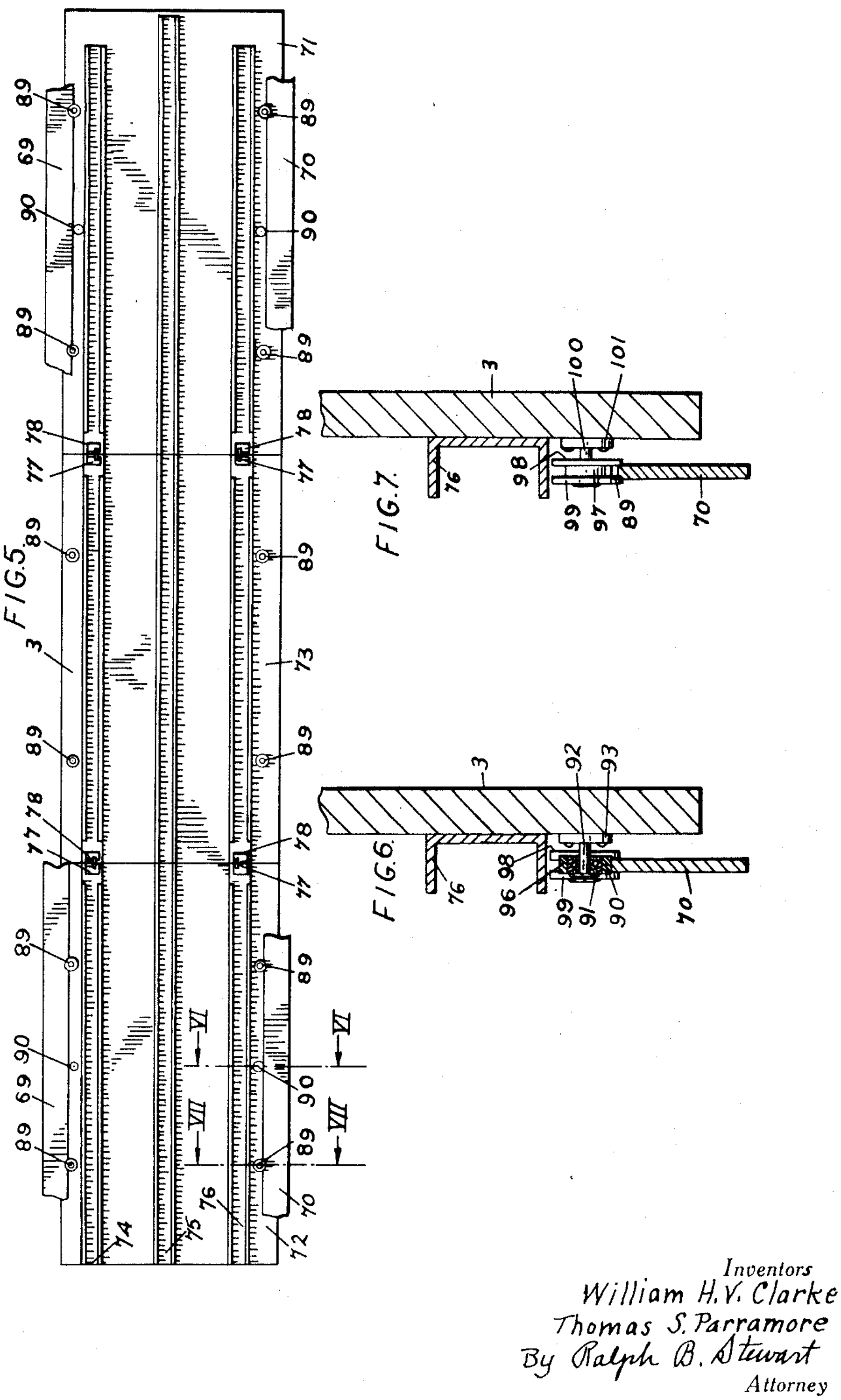
Figure 5 is a rear elevation view of the display board.
Figure 6 is a section through the lower part of the display board on the line VI—VI of Figure 5.
Figure 7 is a section view of the lower part of the display board on the line VII—VII of Figure 5.

As will be seen from Figure 5, the display board 3 is similarly made up in three sections, 71, 72 and 73, corresponding approximately to the sections 15, 16 and 17 of the framework 2. If the mid-section 17 of the framework is omitted, section 73 of the display board is similarly omitted, and if a number of sections similar to section 17 are included in the whole framework 2, the display board 3 is made up to include the same number of mid-sections corresponding to the section 73.

The display board 3 is kept rigid by three channel sections, 74, 75 and 76, which extend the whole length of the display board 3, being secured to the back of the display board 3, as shown in the detailed views of Figures 6 and 7. The sections 71, 72 and 73 are joined together by mechanically connecting the members 74 and 76, section for section, while the member 75 abuts the adjacent sections without being connected thereto mechanically.

Figures 8, 9, 10:
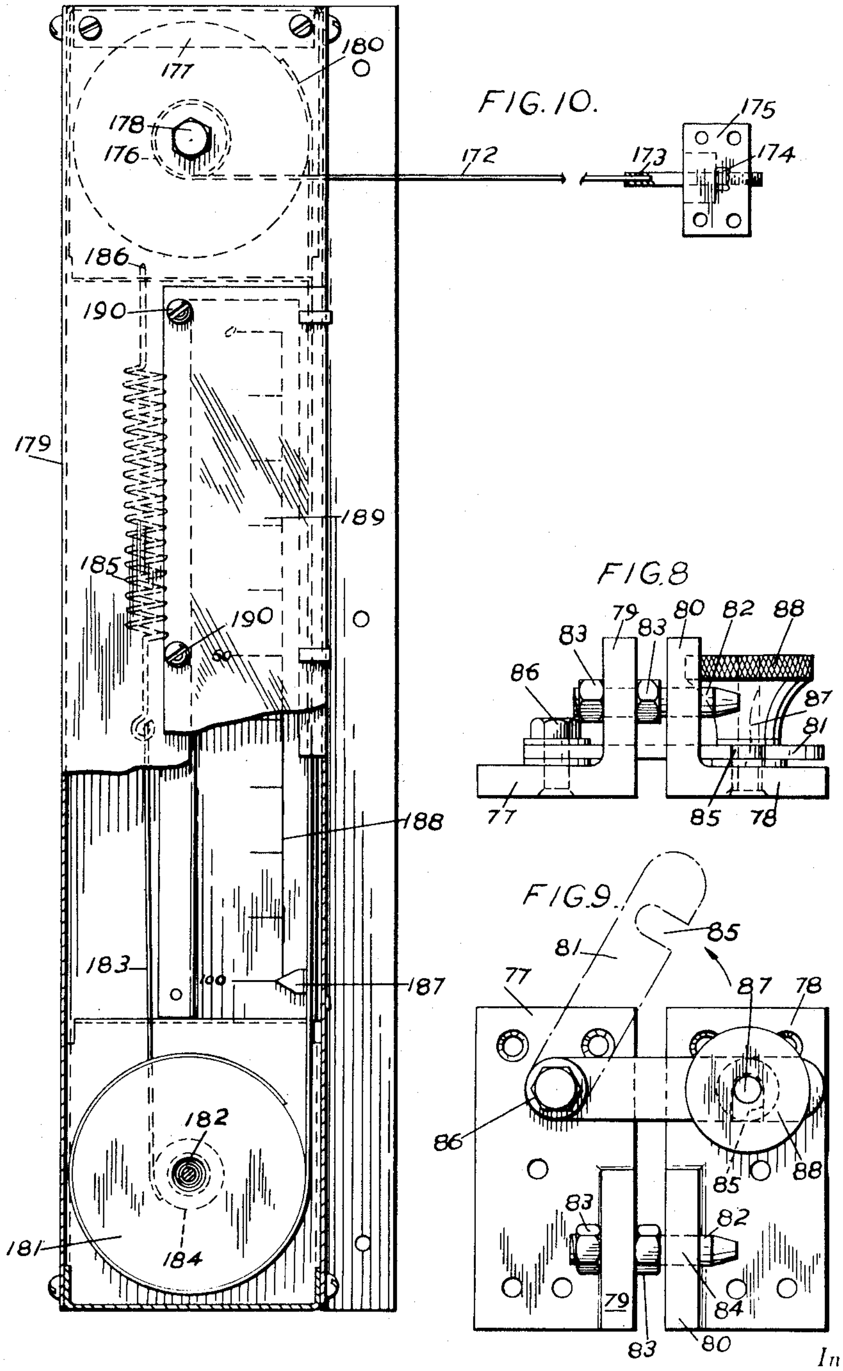
Figure 8 is a plan from below of a coupling means for adjacent sections of the display board.
Figure 9 is a rear elevation view of the coupling means of Figure 8.
Figure 10 is a front elevation of a position indicator showing the displacement of the display board from a reference zero position.

A connecting means for the several sections of the display board 3 comprises a simple dowel pin and socket locating arrangement, combined with a swing over latch coupling as shown in the detailed drawings of Figures 8 and 9.

At each end of the mid-sections 73 and at the inner ends of the outer sections 71 and 72 the members 74 and 76 are provided with short angle brackets 77 and 78, having one face secured to the members 74 and 76, the extreme ends of the channel members 74 and 76 being cut away to accommodate the brackets.

Each of the brackets, 77 and 78 has part of the backward projecting face cut away leaving the portions 79 and 80 to accommodate a latch 81. The face 79 has a tapered dowel pin 82 secured to it by nuts 83, while the corresponding face 80 has a locating hole 84, as best seen in Figure 9.

The latch 81 is provided with a downward facing slot 85 and is pivoted to the bracket part 77 at 86. The bracket member 78 has a correspondingly positioned threaded stud 87 provided with a knurled locking nut 88.

When the sections of the display board 3 are assembled the dowel pins 82 fit into the locating holes 84 to provide register of the display board sections transversely, and the latches 81 are swung over into engagement with the stud 87 and secured by tightening the lock nuts 88, thus holding the sections longitudinally.

Figure 19:
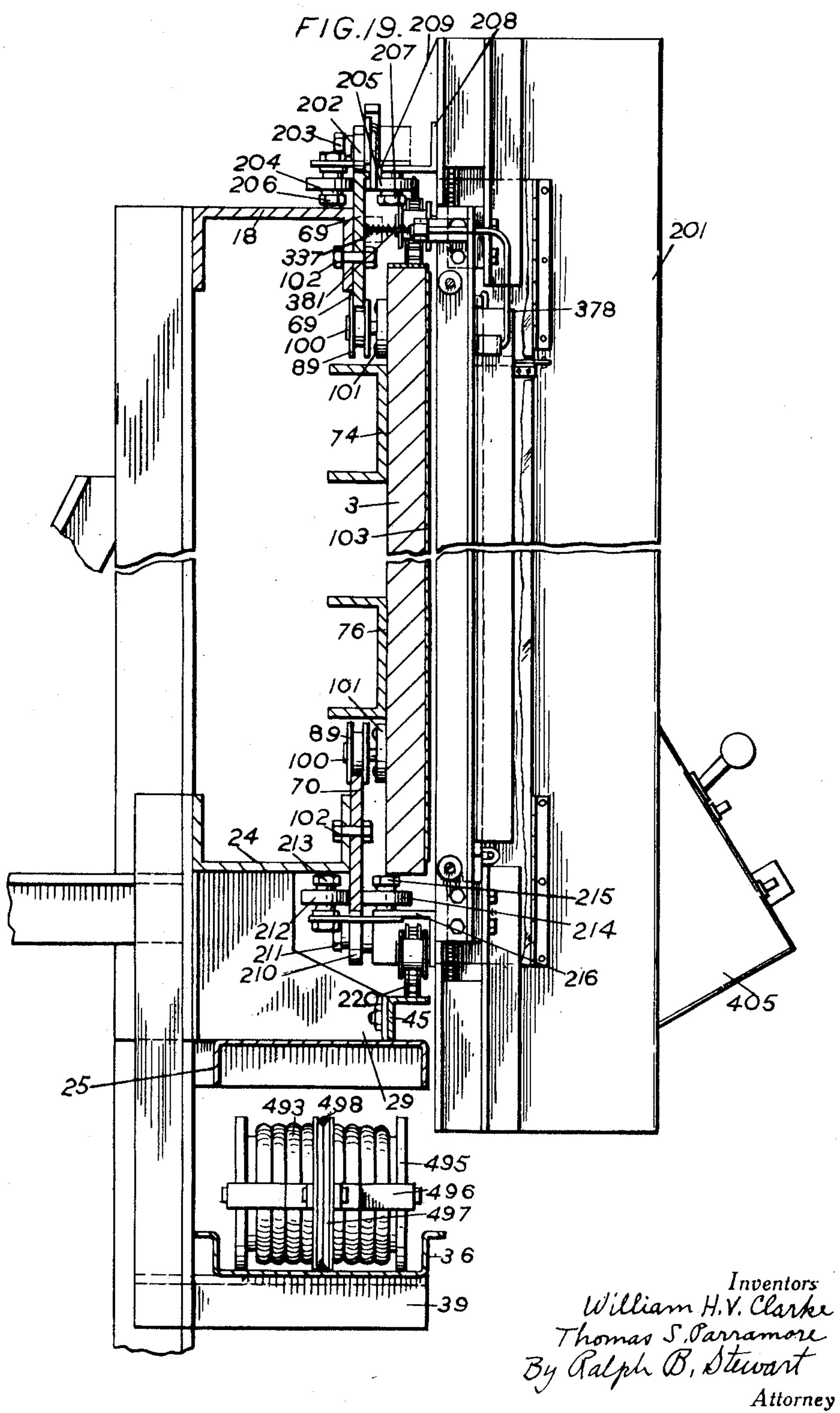
Figure 19 is a section on the line XIX—XIX of Figure 17; showing the framework and display board in section and showing the recorder carriage and cable laying pulley in end elevation.

As shown in Figure 19, an upper guide rail 69 having a forwardly projecting top edge is secured by bolts 102 to the face of the longitudinal member 18. Similarly, a lower guide rail 70 is secured by bolts 102 to the face of the longitudinal member 24.

The display board 3 is carried between the bottom edge of the upper guide rail 69 and the top edge of the lower guide rail 70, and two sets of rollers 89 and 90 are provided so that the whole display board 3 can run lengthwise on the rails 69 and 70.

As shown in Figures 6 and 7, the two sets of rollers 89 and 90 serve different purposes. The rollers 90 are provided only on the end sections 71 and 72 of the display board, and consist each of a ball bearing 91 mounted on a stub shaft 92 fixed to the display board 3 by a plate 93. The ball bearing 91 is provided with a roller 96 which carries the actual weight of the display board 3, or prevents lifting movement.

The rollers 89 prevent movement of the display board 3 towards or away from the framework 2 and consist each of a pulley 97 with front and rear flanges 98 and 99 respectively, mounted on a stub shaft 100 secured to the display board 3 by a plate 101.

The mid-section 72 is provided only with the rollers 89 so that the weight of this mid-section 73 is carried on the pulleys 90 provided on the outer sections 71 and 72.

The display board 3 is adapted to receive a sheet of electrolytic recording paper 103 along its whole length as shown, for example, in Figure 1.

This recording paper 103 provides the actual recording surface of the recorder, and a roll of the recording paper for a number of recording operations is fixed in position at the right-hand end of the framework 2.

Figure 11:
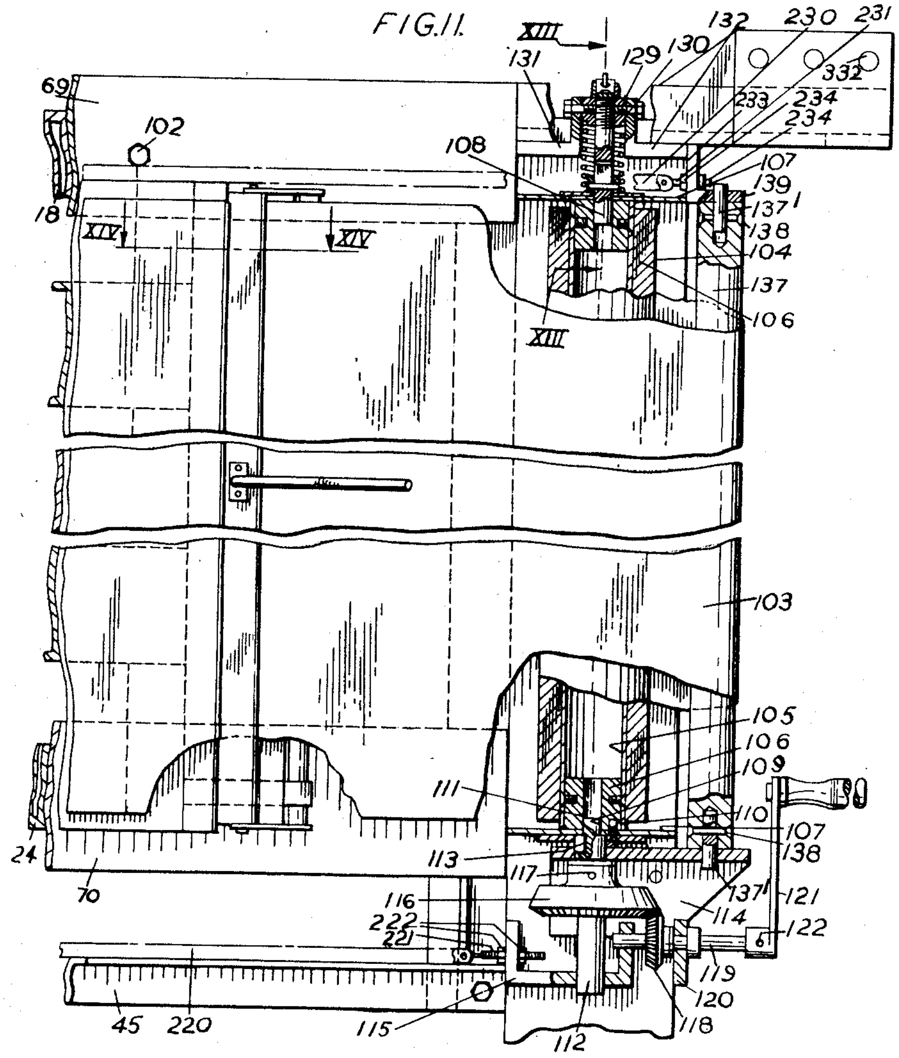
Figure 11 is a front elevation view of the right-hand end of the recorder, in which the recording paper is broken away to show in section the top and bottom mountings for a roll of recording paper.
Figure 12:
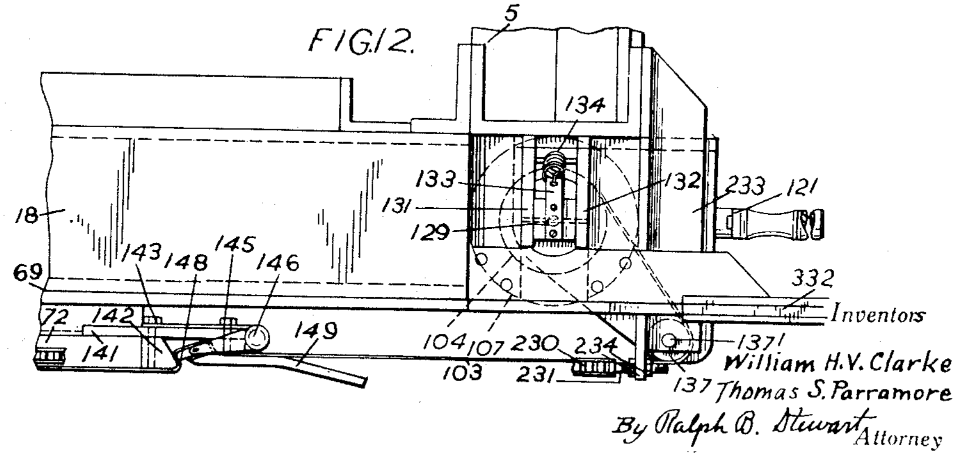
Figure 12 is a plan view of the recording paper roll mounting of Figure 11.
Figure 13:
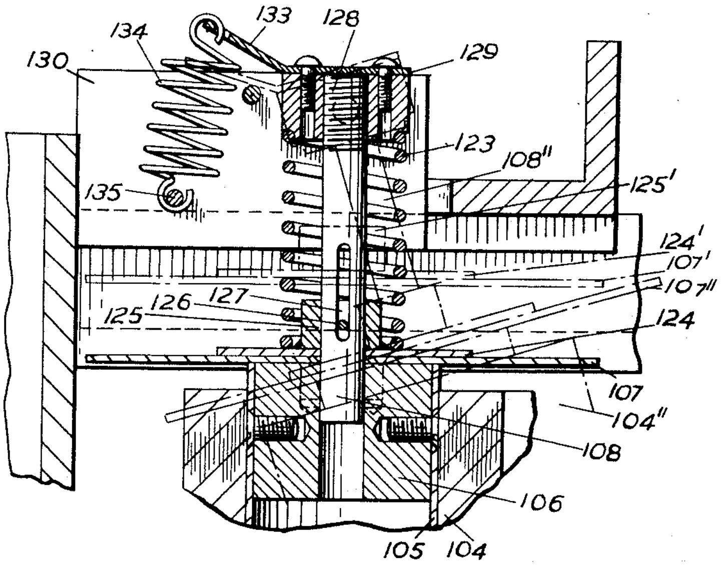
Figure 13 is a section view of the upper part of the mounting on the line XIII—XIII of Figure 11.

The details of the roll fittings are best seen in Figures 11, 12 and 13. A paper roll 104 has a hollow core 105 provided with hollow cylindrical end plugs 106 and flanges 107. The paper roll 104 is held between centres 108, 109, the upper centre 108 being loaded and the lower centre 109 being connected to a geared winding mechanism. Offset from the centre 109 is a pin 110, which locates in a corresponding hole 111 in the lower end plug 106 and prevents the roll 104 from slipping relatively to the winding mechanism.

Figures 17, 18:
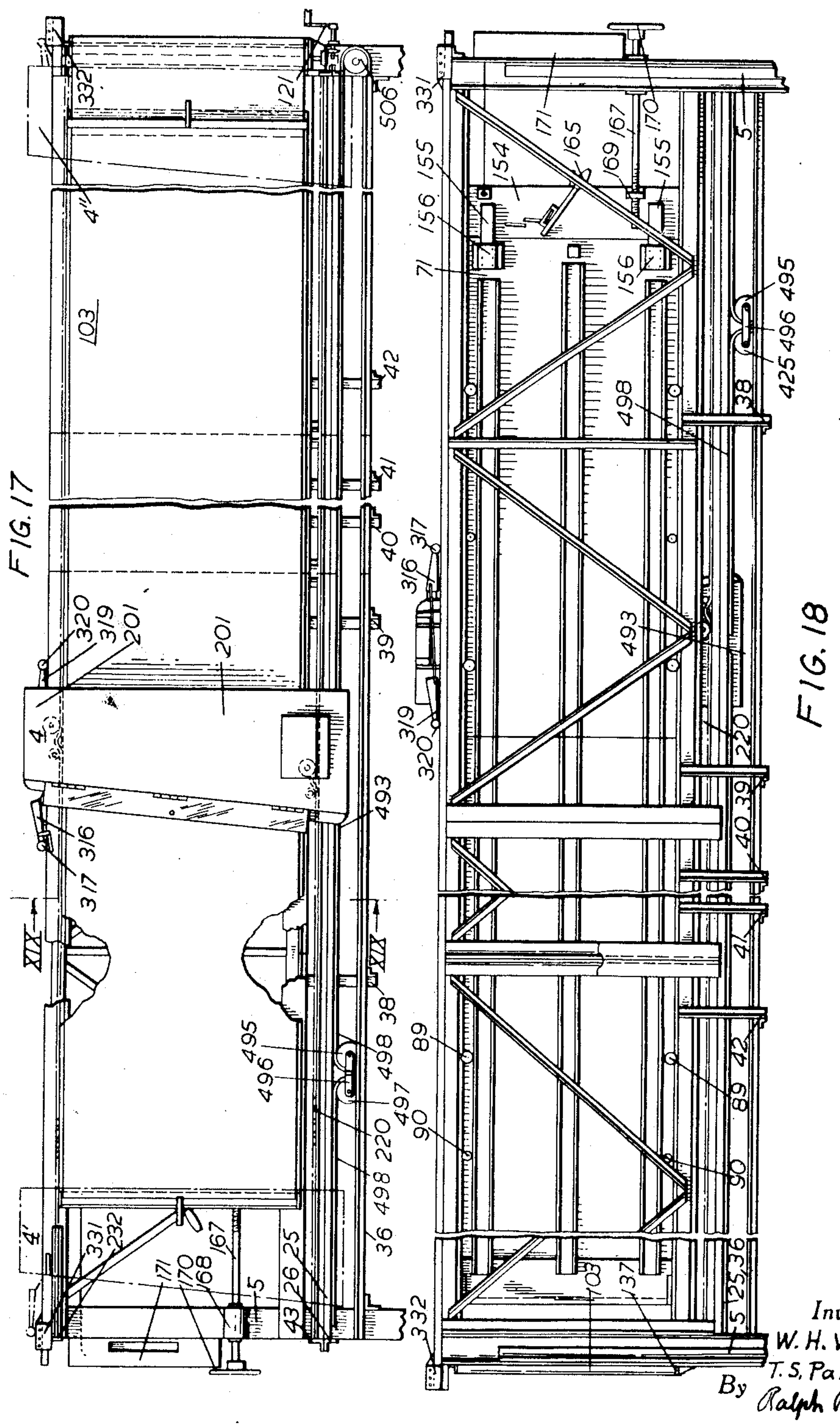
Figure 17 is a general front elevation view of the upper part of the recorder with parts broken away to show details of the framework construction, in which the recorder carriage is shown in a position along its traverse and also shown in dotted lines at the limits of its travel at the left-hand and right-hand ends of the recorder framework.
Figure 18 is a rear elevation view of the upper part of the recorder shown in Figure 17.

The centre 109 is at the upper end of a spindle 112 which is held in a bush 113 in an angle bracket 114 and in a hole in a channel sectional bracket 115. A crown wheel 116 is secured to the spindle 112 by a transverse pin 117, and meshes with a pinion 118 fixed on a shaft 119, mounted at right angles to the spindle 112 in holes through a side face of the bracket 115 and in a plate 120. The shaft 118 has a crank handle 121 attached to it by a transverse pin 122. The fitting at the upper end of the roll 104 is most clearly shown in the detailed drawing of Figure 13, from which it will be seen that the flange 107 of the roll 104 abuts against the face of the flange 124 of the bush 125.

recording operations, the graphs being arranged in vertical and horizontal rows. The longitudinal separation of the record points is controlled by moving the whole display board manually and it will therefore be appreciated that both the control and the indication of this longitudinal movement must be precise. This requirement is provided, as will be seen best from Figures 17 and 18, by means of a threaded rod 167, which is retained in, but constrained from longitudinal movement by, a bearing 168 attached to the front of the left-hand upright 5. The right-hand end of the threaded rod 167 passes through a threaded bracket 169 which is secured to the board 71. The threaded rod 167 is provided at its left-hand end as seen in Fig. 17 with a hand wheel 170 by which the threaded rod 167 may be turned in the bearing 168 and the whole display board 3 moved towards one end or the other of the framework 2. The extent of the movement provided is rather more than the length of a section in a zone on the recording surface, that is, a little more than three inches.

The distance moved by the display board 3 to the left of an arbitrary zero point is shown on a magnifying indicator, illustrated generally at 171 in Figures 17 and 18, and shown in greater detail in Figure 10. As shown in Figure 10, a steel tape 172, terminating in a short length of threaded rod 173 is secured by a nut 174 to a bracket 175, which is attached to the board 71 near its upper end.

The tape 172 is attached to the circumference, and passes round the smaller diameter surface 176 of a stepped pulley 177. The pulley 177 is mounted on a horizontal axis 178 in a casing 179. A second steel tape 180 is attached to the outer circumference of the stepped pulley 177 and, passing partly round the circumference, extends downwards close to one face of the casing 179 to a lower stepped pulley 181, where it is similarly attached to, and passed partly around, a larger circumferential surface. This second stepped pulley 181 is mounted on a spindle 182 in the casing 179 so that its axis is parallel to that of the upper stepped pulley 177. A third steel tape 183 is attached to the inner circumferential surface 184 of the stepped pulley 181 and extends upwards to the lower end of a tension spring 185. The spring 185 is secured at 186 to a fixed point on the casing 179, and serves to keep the whole of the pulley system and tape 172 in tension. The tape 180 carries on its vertical portion a pointer 187 which moves over a graduated scale 188, the scale 188 being visible through a transparent cover 189 which is secured by screws 190 to the outside of the casing 179.

The carriage 4 has a casing 201 extending from the top to the bottom of the display board 3, the left-hand side of the casing 201 being inclined to the left at its lower end so that the casing 201 is slightly wider at the bottom than at the top.

The carriage 4 is arranged to run on the guide rails 69 and 70, the whole of the weight being carried by the upper guide rail 69. For this purpose the carriage 4 has rollers 202 mounted on horizontal axes 203 which run on the top edge of the upper rail 69 (Figure 19). Further rollers 204 and 205 mounted on vertical axes 206 behind the rail 69 and 207 in front of the rail 69 respectively are provided as check rollers to prevent movement of the carriage 4 towards or away from the framework 2.

These rollers are carried on an angle bracket 208 which, together with the vertical brackets 209, carry the weight of the recorder carriage 4.

At the bottom, a roller 210 mounted on a horizontal axis 211 is provided in contact with the bottom edge of the rail 70. Rear rollers 212 mounted on vertical axes 213 and a front roller 214 mounted on vertical axes 215 are provided to engage the rear and front face respectively of the rail 70, to prevent the bottom of the carriage 4 from swinging forwards or backwards. These rollers 212 and 214 are mounted on a bracket 216 attached to the casing 201.

The carriage 4 is driven from the left-hand end to the right-hand end of the display board 3 during a recording operation, and the carriage 4 travels on the rails 69 and 70 being driven by an electric motor inside the carriage through a gear train which engage a longitudinal roller chain serving as a rack.

As seen, for example, in Figure 17, a roller chain 220 is cut to the full length of the framework 2 when the framework is made up and is provided at each end with a screw coupling 221 which, at the left-hand end, passes through the angle bracket 43, and at the right-hand end through the angle brackets 115, being secured in position by the locking nuts 222 (Figure 11). At the top of the framework a similar chain 230 is provided at each end with threaded connectors 231 which, at the left-hand side, passes through a bracket 232 and, at the right-hand side, passes through a bracket 233, being secured by the nuts 234. The lower chain 220 rests on the angle member 45 which runs, in sections, the whole length of the framework 2 and which is supported from the framework by the brackets 28, 29, 30, 31, 32, 33, 34 and 35, of which the bracket 29 is shown in Figure 19.

Figure 22:
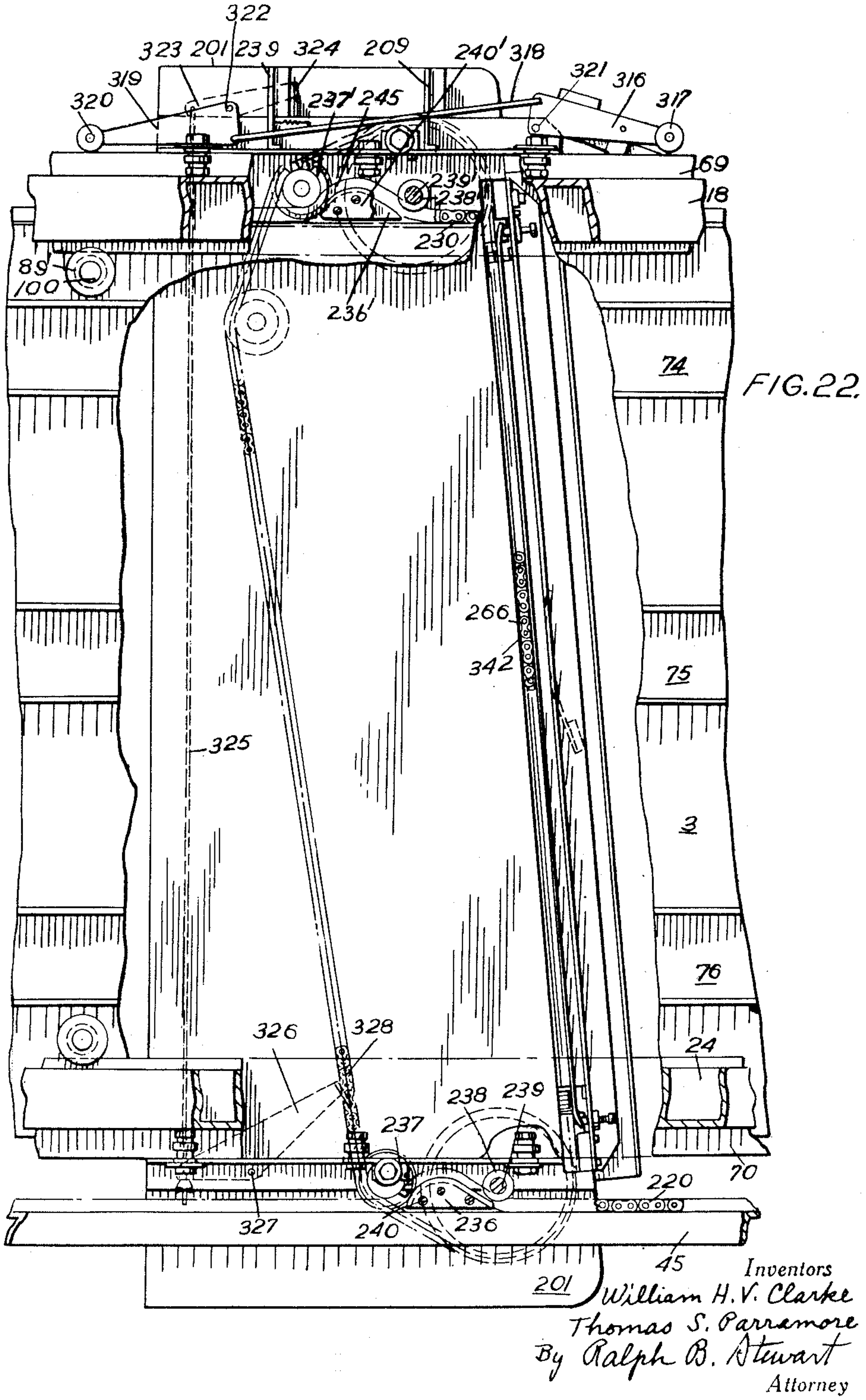
Figure 22 is a rear view of the recorder behind the recorder carriage, the display board and recording paper being broken away to show the details of the recorder drive and the stylus chain support.

As shown in the rear view of Figure 22, a double inclined ramp 236 is fixed to the rear face of the casing 201, and extends under the chain 220 so that the chain 220 passes over its upper surface. This is to provide a greater angle of mesh between the chain 220 and a driving sprocket wheel 237, and at the other end of the ramp 236 a flanged jockey pulley 238, mounted on the casing 201 on a horizontal spindle 239, is provided to prevent the chain 220 from riding up off the ramp surface. In addition a plate 240 is provided on the back face of the ramp 236 to prevent the chain from leaving the ramp surface in that direction. Near the top of the casing 201 a similar double inclined ramp 236′ is provided, extending backwards under the chain 230. This ramp 236′ serves to pick up the chain 230 and provide a greater angle of mesh with a top driving sprocket wheel 237′. A similar flanged jockey pulley 238′ mounted on a short spindle 239′ is provided to keep the chain 230 from riding up off the ramp surfaces and a plate 240′ fixed to the back surface of the ramp 236′, prevents the chain from leaving the ramp surfaces.

Figures 20, 21:
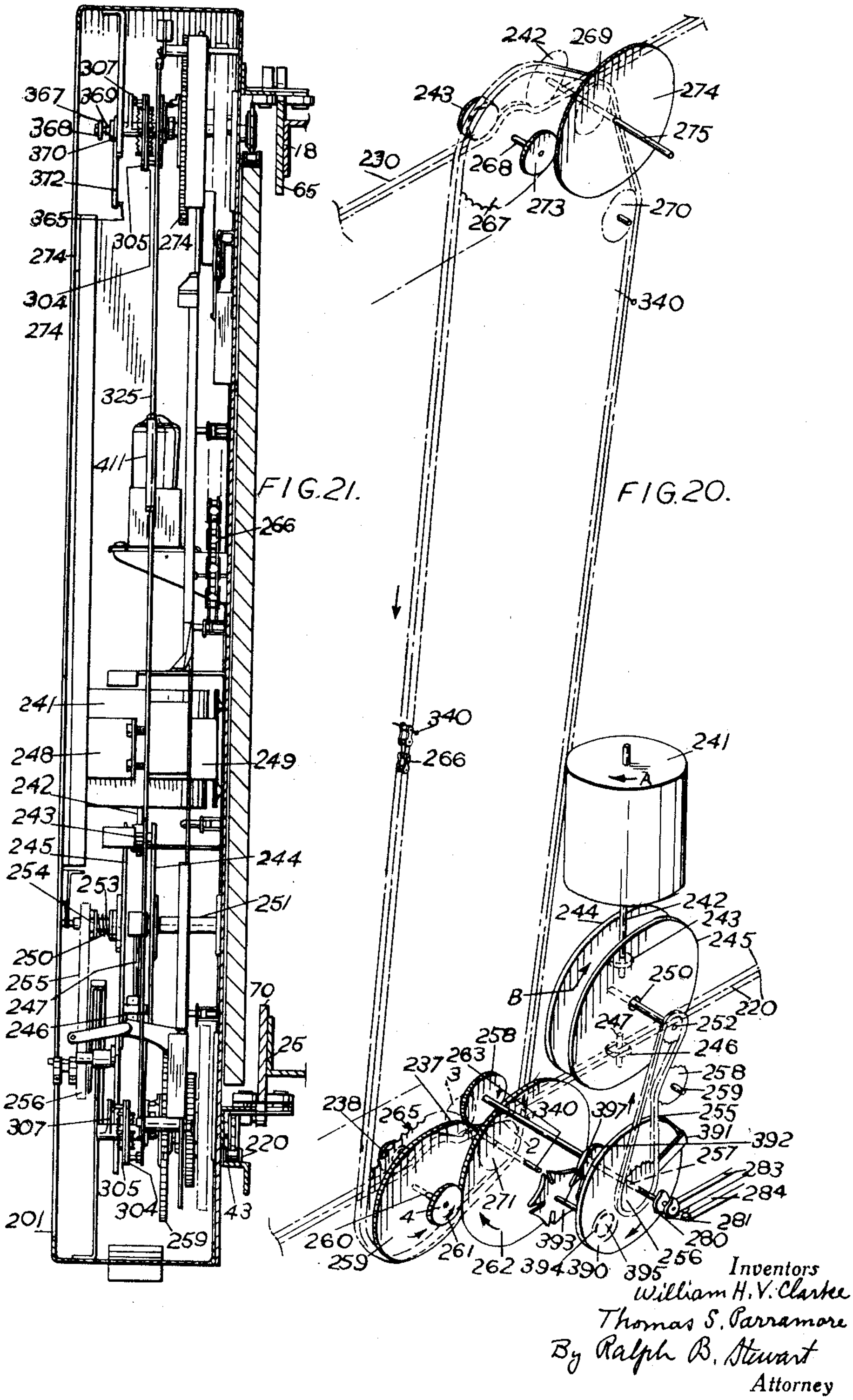
Figure 20 is a diagrammatic perspective view showing details of the drive for the recorder carriage and for the stylus chain carried in the recorder carriage.
Figure 21 is a right-hand end elevation view of the recorder, the end of the carriage casing being removed to show the internal details.

The general arrangements of the drive of the carriage 4 can be best seen from the diagrammatic representation of Figure 20.

The driving motor of the carriage 4 is a small electric motor 241 with its spindle 242 set vertically. At its lower end the spindle 242 carries a friction driving pulley 243 rotating between two large friction discs 244 and 245 which turn about a horizontal axis.

An idler pulley 246, mounted on a vertical

The bush 125 is secured to the centre spindle 108 by a transverse pin 126 located in a transverse slot 127, in the centre spindle 108. The bush 125 is therefore free to move longitudinally along the centre spindle 108 within the limits of the slot 127. The upper end 128 of the centre spindle 108 is threaded and fits into an internally threaded bush 129, which is mounted on a transverse pivot 130 so that the whole mounting can swing forward. A compression spring 123 is mounted between the bush 129 and the bush 125 and presses the flange 124 into engagement with the flange 107. The transverse pivot 130 is mounted on angle brackets 131 and 132 which are in turn mounted on the framework upright 5. The upper face of the bush 129 has a bent arm 133 attached to it, and a tension spring 134 is attached to the outer end of the arm 133, and to a pin 135 fixed to the brackets 130 and 131.

An empty paper roll 104 may be lifted against the pressure of spring 123 so that the lower end plug 106 is lifted clear of the centre 111. The flange 107, the flange 124, and bush 125 are then in the raised positions shown at 107′, 124′ in Figure 13.

The empty paper roll 104 may then be drawn forward at its lower end, the upper mounting swinging on its pivot 130, until the roll 104, flange 107 and centre spindle 108 are moved into the positions 104″, 107″ and 108″ respectively.

The roll 104 may then be withdrawn downwardly from the centre spindle 108. The spring 134 retains the upper mounting in the forward position so that a new roll of paper may be loaded into the mounting by fitting the end plug 106 on to the end of the centre spindle 108, lifting the end plug 106 on to the centre 109 and engaging the pin 110 in the hole 111.

The recording paper 103 is drawn off the roll 104 over a roller 137 arranged in the plane of the display board 3, and with its axis parallel to the axis of the roll 104. The roller 137′ is held by short spindles 137 which are secured to the roll by transverse pins 138 and extend through an upper bracket 139 and the lower bracket 114.

Sufficient recording paper is drawn off the roll 104 to run the whole length of the display board 3 and the recording paper 103 is secured by the paper clamps now to be described. The excess length of paper is re-wound on to the roll 104 by means of the winding handle 121.

The left hand and right hand paper clamps are similar, the only difference being in the mounting for left-handed and right-handed operation respectively. The right-hand paper clamp is best seen in Figures 11 and 12 and the enlarged view of Figure 14, and only this paper clamp need be described.

At the extreme right-hand of the display board 3, section 72 has an extension plate 141 fitted thereto and an undercut edge member 142 is mounted adjacent the end of the display board 72, being attached to the plate 141 by transverse bolts 143. A second member 144 having a shaped front face is attached to the plate 141 by transverse bolts 145.

A hinge 146 is secured to the back of the plate 141 by bolts 143 and 145, and carries pivots 147 for a flat clamping bar 148 to which is attached an operating handle 149.

Figure 14:
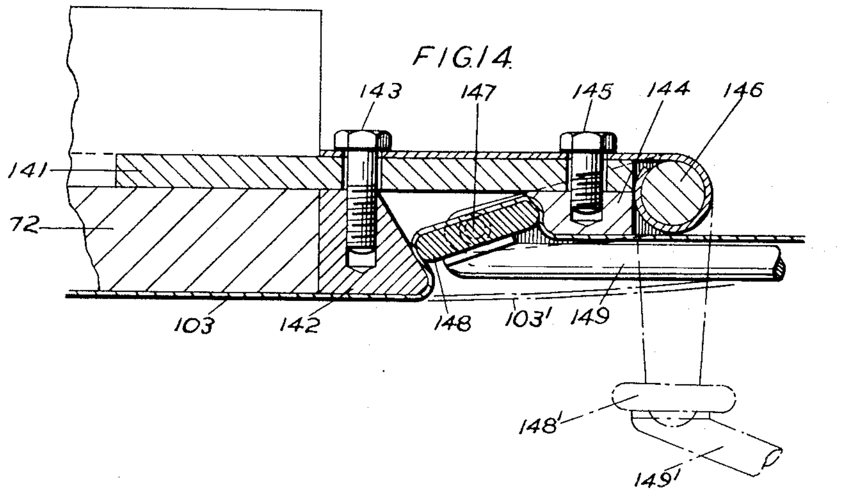
Figure 14 is a section of the right-hand paper clamp on the line XIV—XIV of Figure 11.

In use, the clamping bar is moved by the handle 149 into the position shown at 148′ and 149′ in Figure 14. The recording paper is drawn over the surface of the display board 3 in the position shown at 103 and 103′ in Figure 14. The clamping bar 148 is moved over by the handle 149 until the left hand nose of the clamping bar engages the paper 103 and holds it against the undercut surface of the edge member 142. The handle 149 is then moved back towards the framework so that the right-hand nose of the clamping bar 148 holds the paper against the shaped portion of the member 144. In this way the recording paper 103 is held tightly along the whole of its width.

When arranging the recording paper 103 on the face of the display board 3, the preferred method is to draw off the required length from the paper roll 104 and secure the left-hand end by means of the left-hand paper clamp. The excess length of paper which has been drawn off the paper roll 104 is then re-wound by means of the winding handle 121 and the paper 103 is then clamped by means of the right-hand paper clamp.

Figures 15, 16:
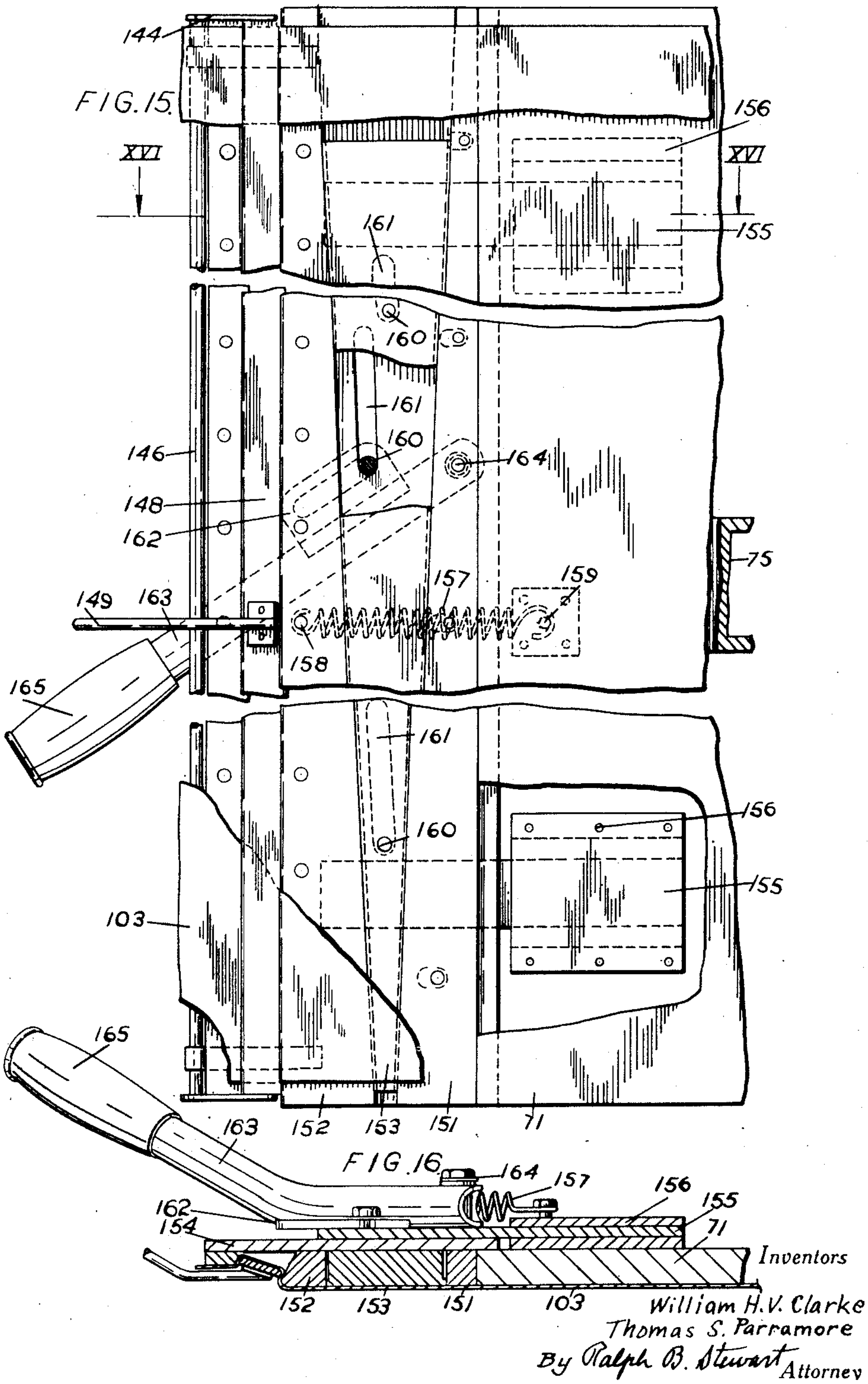
Figure 15 is a front elevation view of the display board extending arrangement.
Figure 16 is a section view on the line XVI—XVI of Figure 15.

This method ensures that there is no undue slackness of the recording paper between the paper clamps but, before a recording operation, the paper is stretched by extending the length of the display board 3 longitudinally by means of the sliding wedge arrangement illustrated in Figures 15 and 16, and the rear view of Figure 18.

The left-hand end of section 71 of the display board 3 has an extension 151 with an inclined left-hand face and an extension 152 with an oppositely inclined right-hand face. Between the two extensions 151 and 152 is fitted a V-shaped wedge 153. The extension 152 has its left-hand edge undercut to provide one of the paper holding surfaces of the left-hand paper clamp, and is also attached to a back plate 154 which extends behind the wedge 153 of the extension 151. On the back of the plate 154 are mounted two slide bars 155 which run in guides 156 to locate the extension pieces relatively to the remainder of the display board 3.

The left-hand extension 152 is also pulled towards the section 71 by a tension spring 157 extending between a pin 158 on the extension 152, and a pin 159 attached to the display board section 71. The wedge 153 is free to move up and down between the inclined faces of the extensions 151 and 152 and, when it is raised or lowered, allows the extension 152 to move towards the extension 151 or separates the two respectively.

The wedge 153 has three backwardly extending pins 160 secured to it and these pass through slots 161, in the plate 154 and guide the wedge parallel to the extension 152 to which the plate 154 is attached.

The centre of the pins 160 passes also through a slotted plate 162 which is attached at one edge to a bent tubular lever 163 pivoted to the extension 151 at 164 and having a handle grip 165 at this outer end.

When the lever 163 is raised, the slotted plate 162 raises the pin 160 and so raises the whole of the wedge 153. The spring 157 pulls in the extension 152 and so reduces the overall length of the display board 3.

The recording paper 103 is fitted with the lever 163 in its raised position and, after the paper clamps have been secured, the lever 163 is moved downwards so as to apply the necessary tension to the recording paper 103.

The manner in which a record is made with this example of the recorder is described in detail later and it is sufficient here to explain that the records are in the form of graphs made up of separate points recorded in a sequence of spindle 247, is provided diametrically opposite the driving pulley 243, thus providing an edge runner type of drive. The rear disc 244 is the driving disc and rotates a shaft 250 which extends forwards through the friction disc 245. The front disc 245 is a reaction member, merely providing pressure between the driving pulley 243 and the driven disc 244. The spindle 250 carries at its forward end a small chain sprocket 252. The arrangement is adjusted in this particular example so that the two discs 244 and 245 rotate in opposite directions at 200 R. P. M. and, since the motor spindle 244 rotates in a clockwise direction viewed from the top and as shown by the arrow A, the driving disc 244 rotates in a clockwise direction as viewed from the front, and as shown by the arrow B. The small sprocket 252 has eleven teeth and is geared by a chain 255 to a sprocket 256 pulley having twenty-two teeth, so that the sprocket 256 rotates at 100 R. P. M.

The chain 255 is engaged by a tensioning idler 258, carried on a short spindle 259.

The last mentioned sprocket 256 is carried on a horizontal shaft 257 which, at its forward end, carries a pair of pointed cams 280, 281. At one point in each revolution of the shaft 257 the cams 280 and 281 close two pairs of switch contacts 283 and 284 respectively which serve as muting switches in a manner more particularly described below.

Towards the back of the horizontal shaft 257 is fixed a small pinion 258, having sixteen teeth which gears with the spur wheel 259, having 40 teeth. The spur wheel 259 is secured to a horizontal shaft 260 so that the shaft 260 revolves at 40 R. P. M. On the shaft 260, and therefore revolving at the same speed, is a chain sprocket 265 having 30 teeth, and this sprocket 265 drives a stylus chain 266.

The stylus chain 266 carries three styli mounted in insulating bushes, as is described in detail with reference to Figure 32. The chain 266 is 90″ long and carries the three styli at uniformly spaced intervals. After passing round the sprocket wheel 265, the stylus chain engages a small sprocket 271 having 12 teeth and which assists in a return traverse of the carriage 4. The chain 266 then passes upwards to the top of the carriage 4 engaging an idler 270 and then passes over another sprocket 269, having 12 teeth, which assists in the return drive at the top of the carriage 4.

The chain 266 then passes over another large sprocket wheel 267 having 30 teeth, which is displaced vertically from the lower sprocket wheel 265, to which the chain 266 finally returns.

The span of the chain 266 between the sprocket wheel 267 and the sprocket wheel 265 provides a working path of 30″ so that as one stylus is leaving the working path at the bottom, the next one in the chain 266 is entering it at the top. The span is slightly inclined to the left at the bottom, as viewed from the front of the recorder, and the displacement is 3″, which corresponds to the distance which the carriage 4 travels along the recording surface during the time taken for one stylus to traverse the working path. It will therefore be seen that the resultant direction of movement of a stylus over the recording paper 104 is vertically downwards.

The forward drive of the carriage 4 is obtained at the bottom of the carriage 4 from the shaft 260 and at the top from the shaft 268, each of which rotates counter-clockwise, as viewed from the front, at 40 R. P. M.

The shaft 260 has a pinion 261 at its forward end having 25 teeth and engaging a large spur wheel 262 having 100 teeth, and which is therefore driven clockwise at 10 R. P. M.

Figures 25, 26, 27:
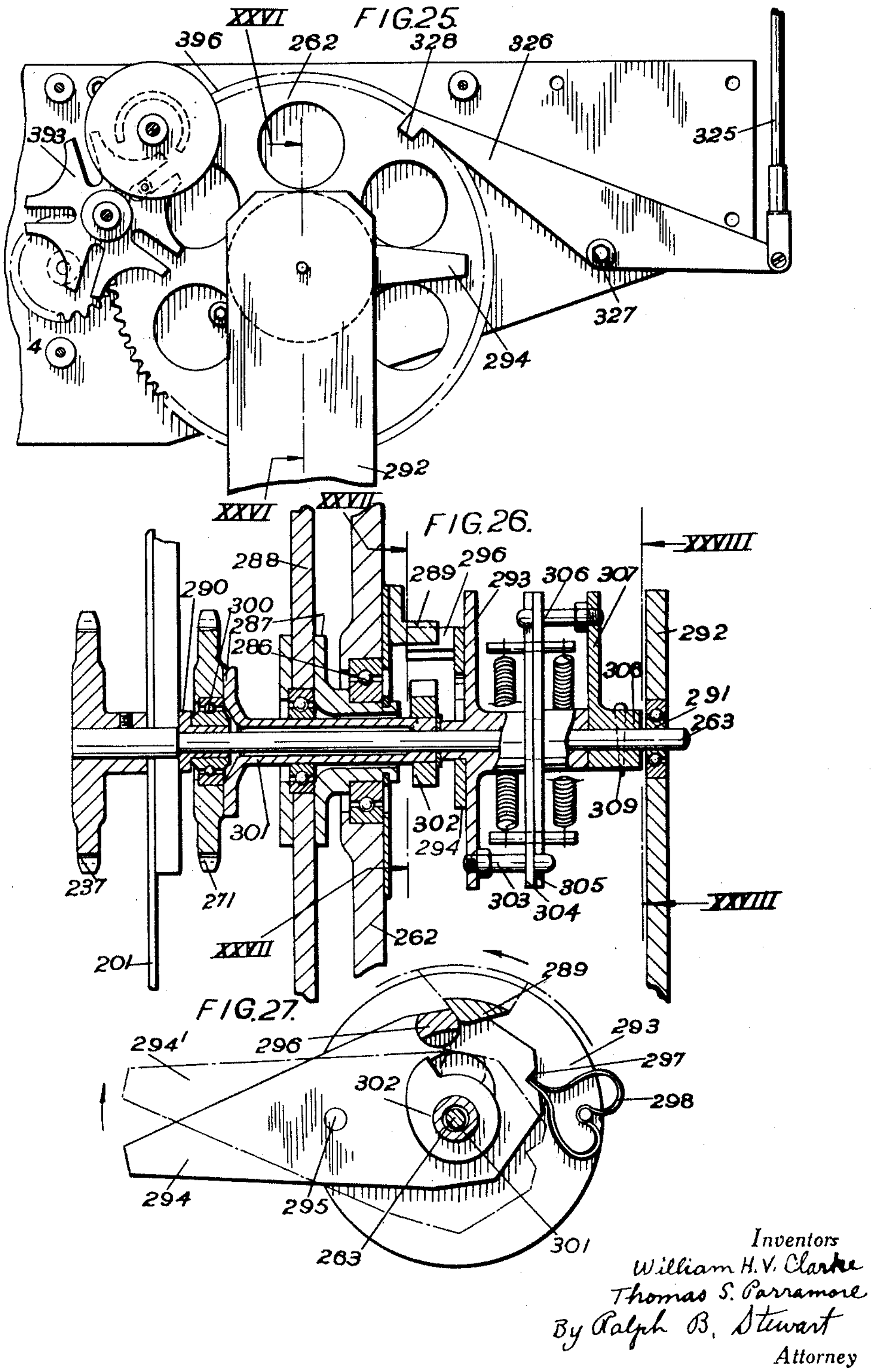
Figure 25 is a front elevation view showing details of the intermittent drive to a 5-way selector switch and details of reversing rocker.
Figure 26 is a section view on the line XXVI—XXVI of Figure 25.
Figure 27 is a section view on the line XXVII—XXVII of Figure 26.

As shown particularly in Figure 26, the spur wheel 262 turns freely on ball bearings 286, carried by a flanged collar 287 from a frame member 288. On its front face, the spur wheel 262 carries a driving dog 289.

The chain sprocket 237, already described, is mounted on the shaft 263 which extends forward from the chain sprocket 237, being journaled in a bush 290 mounted on the casing 201, and carried at its forward end in a ball bearing 291, carried by a frame plate 292. Running freely on the shaft 263, is a disc 293, near the periphery of which a rocker 294 is pivoted about the pivot pin 295. As is shown particularly in Figure 27, the rocker 294 carries a backwardly projecting pin 296. On one side the rocker 294 has an arm which extends beyond the periphery of the disc 293, and on the other side it has a notch 297 engaged by a spring 298, which, during the rocking, passes over dead centre and retains the rocker in the outer position, shown at 294, or at the inner position, shown at 294′, to which it may be rocked.

When the pin 296 is in its outer position, it is engaged by the driving dog 289 attached to the spur wheel 262 and the disc 293 is thus driven in a clockwise direction at 10 R. P. M.

The small sprocket 271 runs on ball bearings 300 mounted on the outside of the collar 290 and has attached to its front face a flanged hollow spindle 301, which revolves freely on the shaft 263 and carries at its forward end a stepped cam 302. It will be recalled that the sprocket 271 is rotated by the stylus chain at 100 R. P. M. in an anti-clockwise direction as viewed from the front, and the stepped cam 302 thus rotates in a clockwise direction according to the view of Figure 27. The pin 296 has its inner face shaped to fit over the circular part of the stepped cam 302 and, when the rocker is in the position shown at 294′, the pin 296 is free of the driving dog 289, but is engaged by the step of the cam 302. Accordingly, the disc 293 is driven in an anti-clockwise direction, as viewed from the front, at 100 R. P. M. and this serves to give a rapid reverse drive for the carriage 4.

Figures 24, 28:
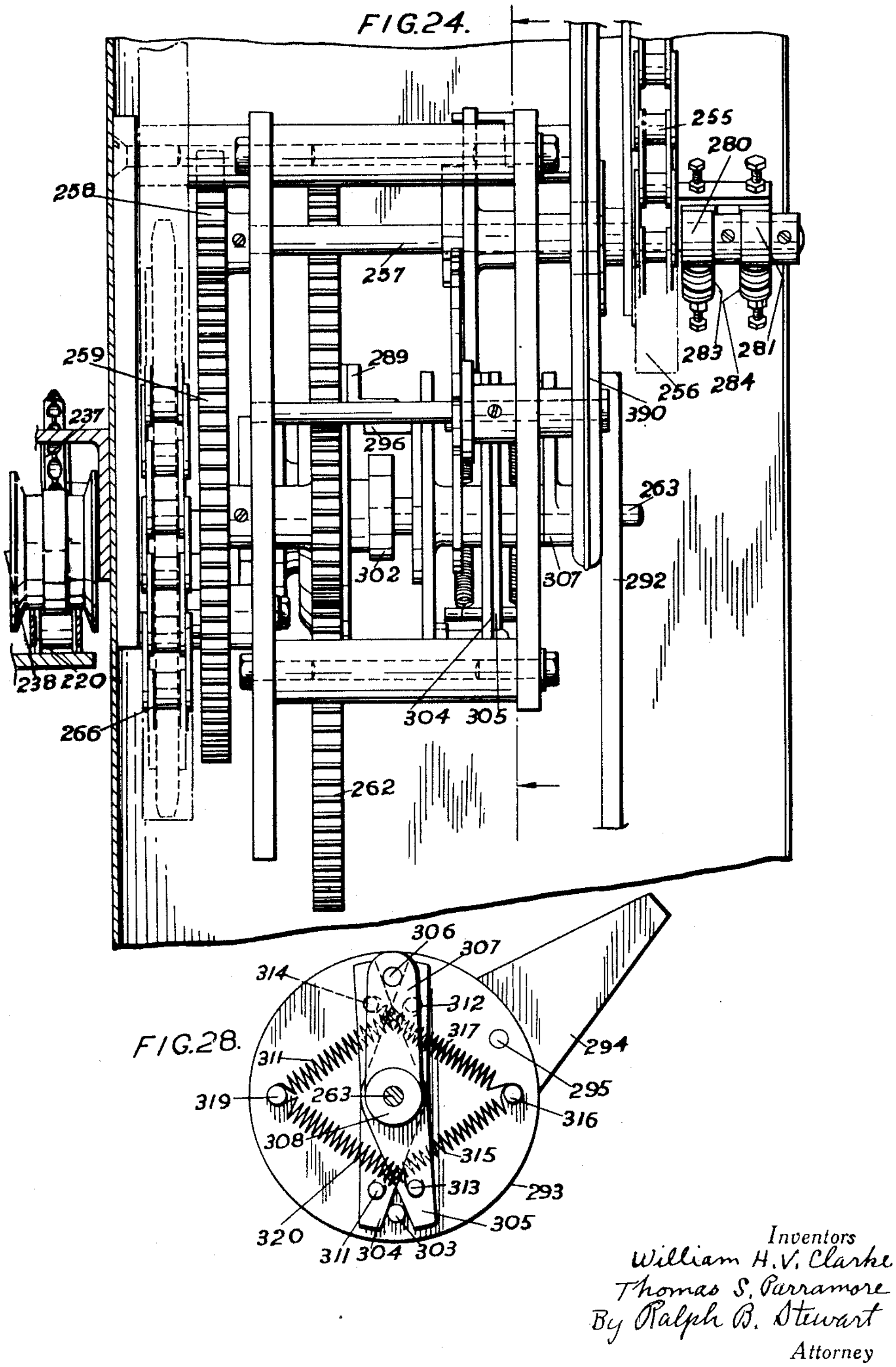
Figure 24 is a section on the line XXIV—XXIV of Figure 23 and provides an end elevation view of the lower driving gear train in the recorder carriage.
Figure 28 is a section view on the line XXVIII—XXVIII of Figure 26, showing a spring coupling in front elevation.

To avoid mechanical shock to the driving system when changing abruptly from forward to reverse drive, a spring coupling is used, the details of which are best seen from Figure 28. The disc 293 has a forwarding projecting pin 303 which extends between the faces of a scissors 304 and 305.

Diametrically opposite to the pin 303, a backwardly projecting pin 306 extends between the faces of the scissors 304 and 305, and is attached to an arm 307 extending radially from a bush 308 secured to the shaft 263 by a transverse pin 309. Opposite ends of the scissors arm 304 carry pins 311 and 312 while opposite ends of the scissors arm 305 carry pins 313 and 314. The pin 311 is connected through a tension spring 315 to a pin 316 projecting from the disc 293, and the pin 314 is also connected to the pin 316 through a tension spring 317. The pin 312 is connected by a tension spring 318 to a pin 319 which projects from the disc 293 diametrically opposite the pin 316, and the pin 313 is connected by a tension spring 320 also to the pin 319. The drive in either direction is transmitted through the spring coupling from the pin 303 to the pin 306 and, whichever is the direction of rotation, one pair or the other of the springs 315, 318, or 317, 320 are in tension. The shock when the carriage 4 is driven forward from rest, or when the drive is reversed, is taken up by the appropriate pair of tension springs of the coupling.

In this way, the forward drive is transmitted from the spur wheel 262 to the chain sprocket 237, or from the sprocket 271 to the sprocket 237, according to whether the pin 296 engages the dog 289 or the step of the cam 302.

Figure 29:
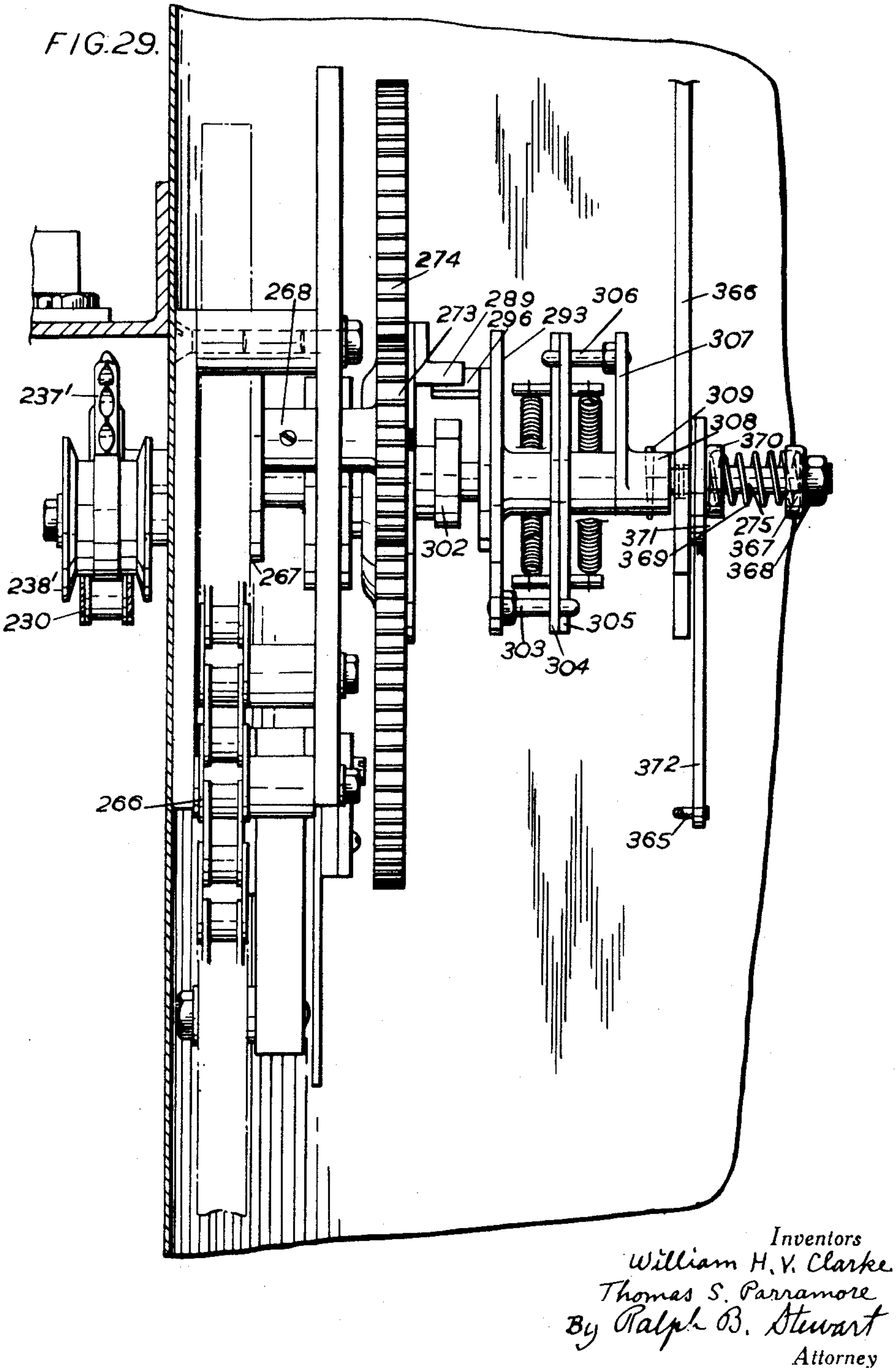
Figure 29 is a section on the line XXIX—XXIX of Figure 23 providing an end elevation view of the upper driving gear train.

As will be seen from Figure 29, the driving gear train, reversing mechanism and spring coupling are duplicated at the top of the carriage 4 and, in Figure 29, like components are indicated by the same reference numerals so that the operation of the top drive will be understood from the foregoing description of the lower drive.

Figure 23:
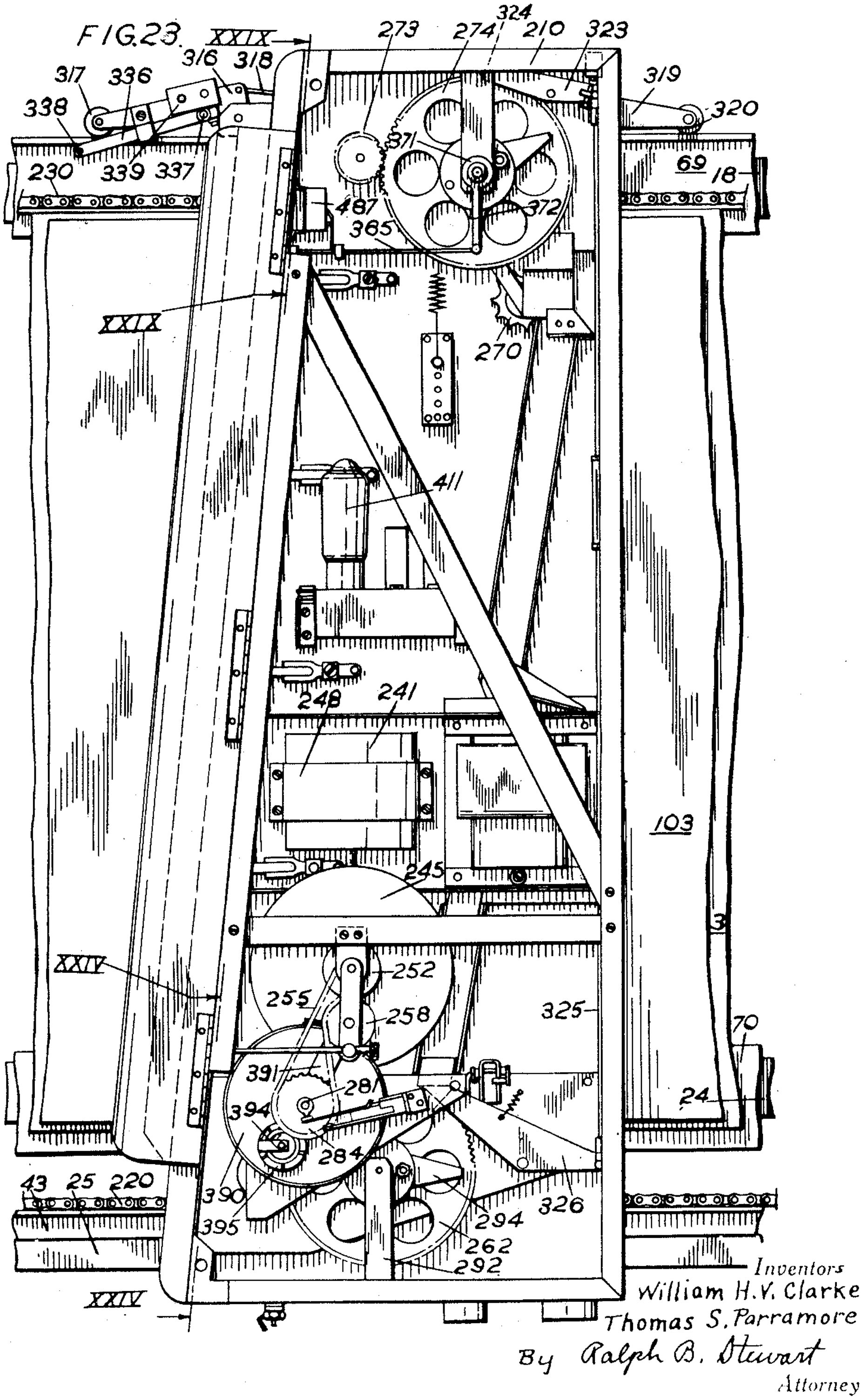
Figure 23 is a front elevation view showing, particularly, the recorder carriage with the front panel of the casing removed.

Reversal of the carriage drive is obtained by means of a rocker mechanism carried at the top of the carriage 4, which is operated by ramps fixed near the right hand and left hand ends of the upper guide rail 69. As seen in Figures 22 and 23, the actuating members comprise a left-hand pivoted rocker 316 bearing a roller 317 and connected by a link 318 to a right-hand pivoted rocker 319 carrying a roller 320. The rocker arm 316 is pivoted at 321, while the rocker arm 319 is pivoted on the short shaft 322 which extends into the casing 201 and carries an arm 323. At one end, the arm 323 carries a striker 324, and at the other end has pivoted to it a vertical rod 325 which extends to a lower arm 326 pivoted at 327 and carrying at its opposite end a striker 328 corresponding to the upper striker 324.

The rollers 317, 320, are arranged to ride up ramps 331, 332 arranged at the left-hand end and the right-hand end of the framework 2 respectively and, as may be seen in Figure 17, the rocker arm 316 is lifted by the ramp 331 when the carriage 4 is in the position shown at 4′ in that figure, while the rocker arm 319 is lifted by the ramp 332 when the carriage 4 is in the position 4″ in that figure. In either case, the lifting of one of the rocker arms also lifts the other rocker arm. The movement is transmitted to the rod 325 which is lifted thereby, bringing the strikers 324 and 328 into the path of the corresponding rocker 294, which rotate, in the case of the lower rocker, about the shaft 263 as axis and, in the case of the upper rocker, about the shaft 275 as axis. In whichever direction the rockers 294 are rotating, the outer end comes into contact with the striker 234 or 238, and the rockers 294 are rocked into the other positions thereby reversing the direction of the drive.

Preferably, both the ramps 331 and 332 are longitudinally adjustable on the upper guide rail 69 to enable changeover of the carriage drive to be set at precisely at the right point in relation to the recording paper 104. In order to facilitate the setting of the ramp 332 at the right hand end, index marks are provided. These index marks are spaced 6″ apart since 3″ is the horizontal separation of the recording zones, so that the automatic reversal can take place only after a multiple of readings corresponding to the number of vertical zones have been taken. In the present case this is a multiple of ten readings.

The forward traversing speed of the carriage 4 is 1 in. per second, and the carriage 4 is driven at this continuous speed from the left-hand to the right-hand of the recorder. When the carriage reaches the position shown at 4″ in Figure 17, the rocker arm 319 actuates the reversing mechanism. The rockers 294, rotate into contact with the strikers 324 and 328 and are rocked, so that the pins 296 occupy the inner position. The drive is thus disengaged from the spur wheels 262 or 274 and engages the stepped cams 302, thereby bringing into operation a reverse drive of ten times the forward speed, that is to say, 10 in. per second.

When the carriage 4 returns to the position in which it is shown at 4′ in Figure 17, the ramp 331 operates the reversing mechanism again and the rockers 294 are tripped over to the forward driving position.

However, it is convenient to arrest the carriage 4 from immediately moving forward again, so that any adjustments of the test conditions may be made before the next series of readings are recorded. For this reason, the driving motor 241 is disconnected from its supply immediately following the reversal. As seen in Figure 23, the rocker arm 316 carries a switch lever 336 pivoted at 337 and carrying at its left-hand end, a small trip cam 338. As the carriage 4 moves to the left, the cam rides over a forwardly projecting pin on the ramp 331. The carriage 4 reverses and, as it moves forward to the right, the cam 338 moves under the forwardly projecting pin, so giving a relative movement between the switch lever 336 and the switch 339 which is mounted on the rocker arm 316, and which is operated by this relative motion. The operation of the switch 337 disconnects the supply from the motor 241 and brings the carriage to rest until it is restarted by closing a push-button switch in the manner described below.

The chain 266 carries three styli 340 arranged at equally spaced intervals along the chain and the details of the mounting will be seen from the enlarged section view of Figure 32. At three equal intervals along the chain 266, the links are held by a hollow rivet 341 into which insulating bushes 342 are inserted from each side making a tight fit. The stylus 340 makes an easy sliding fit in the bushes 342 and projects through the chain 266 so that, when it is in the working position, the point of the stylus makes contact with the surface of the recording paper 103. Over the working path, the chain 266 is guided along an inclined plate 346, which is fixed to the left-hand side of the carriage casing 201. The details of the mechanism for controlling the chain 266 and the styli 340 over the working path will be seen particularly in Figures 30, 31, 32 and 33. The chain 266 is pressed into contact with the surface of the plat 346 by a long leaf spring 347 which is carried at each end by an adjustable screw 348 passing through an insulating bush 349 and carried on an angle bracket 350 rigidly held from the side of the casing 201.

Figures 30, 31:
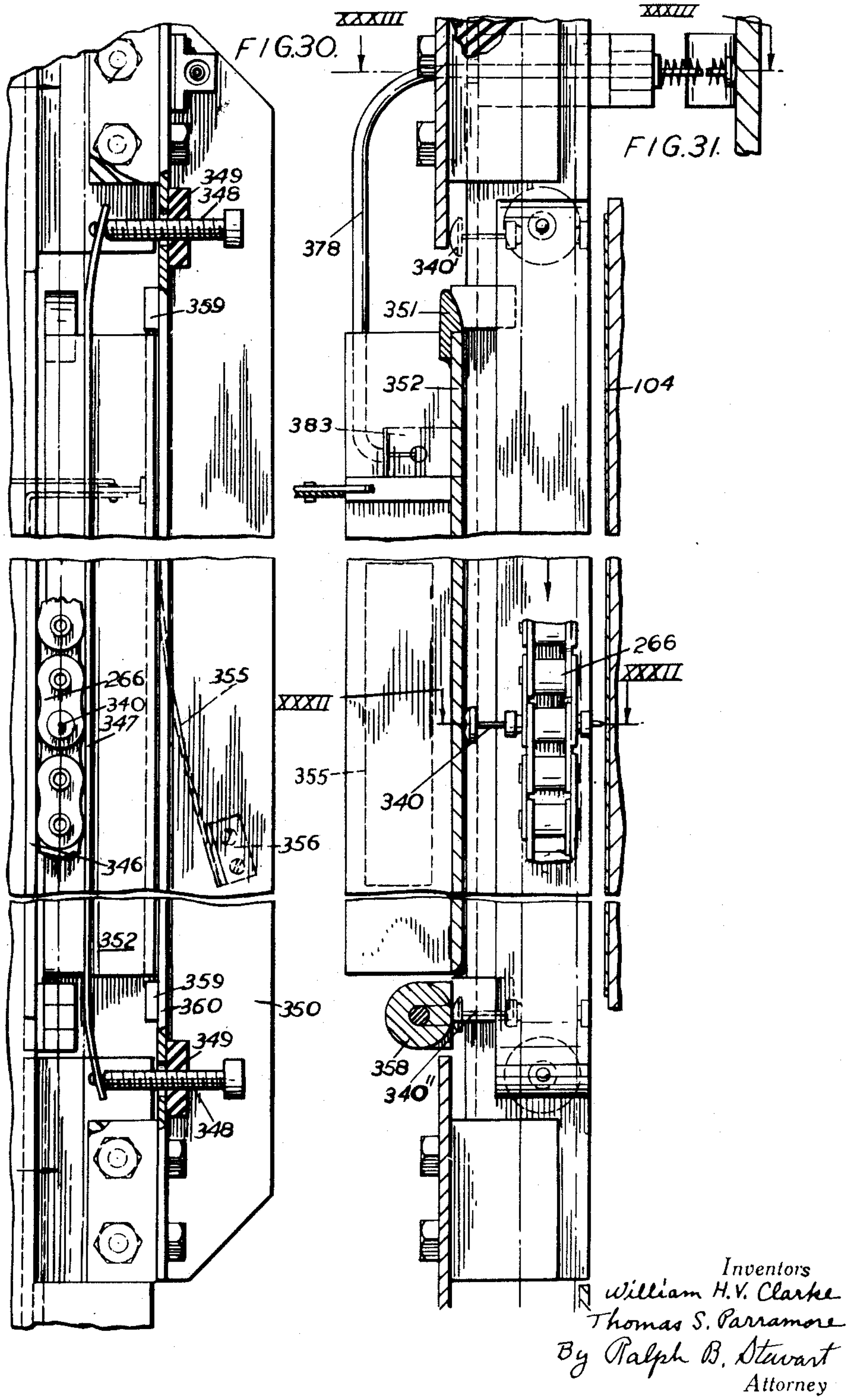
Figure 30 is an enlarged view of part of Figure 22 showing the stylus chain supporting mechanism in detail.
Figure 31 is a right-hand end elevation view of the stylus chain and stylus supportig mechanism of Figure 30.

Before a stylus 340 enters the working path, it occupies the position shown at 340′ in Figure 31, that is, it is partly withdrawn from the bushes 342. As soon as the stylus 340 moves down into the working path, it is engaged by a nose 351 at the upper end of a rocking bar 352 and is urged forward into contact with the recording paper 104 as shown at 340 in Figure 31. The rocking bar 352 is angular in horizontal section with one limb 353 immediately behind the head 354 of the stylus 340 (Figure 32). This limb is pushed against the head by a light leaf-spring 355 secured to the angle bracket 350 at 356 and acting against the other limb of the rocking bar 352. However, when the stylus 340 moves out of contact with the rocking bar 352, the head 354 passes adjacent a small permanent magnet 358, which attracts the head 354, which is of magnetic material. The magnet 358 thus withdraws the stylus 340 from the bush 342, so that the stylus assumes the position shown at 340'' in Figure 31.

Figure 33:
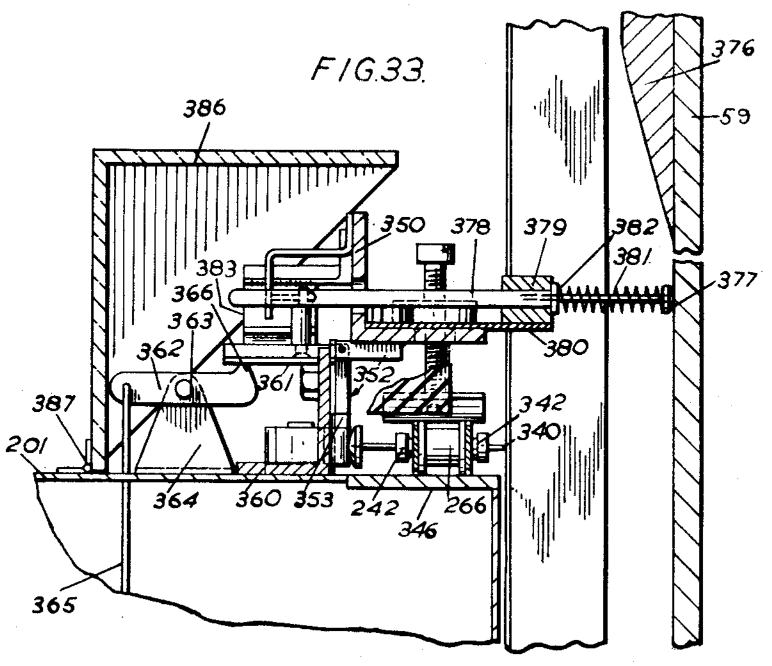
Figure 33 is a section on the line XXXIII—XXXIII of Figure 31.

The rocking bar 352 is pivoted on top and bottom pintles 359 carried by a bracket 360, which is secured to the side of the carriage casing 201. A plate 361 extends forwards from the left hand limb of the rocker bar 352 (Figure 33). A lever 362 is pivoted at 363 on a bracket 364 secured to the side of the casing 201, and is provided at its rear end with a nose 366 which abuts against the plate 361. The forward end of the lever is engaged by an operating rod 365 and when the rod is moved to the right, as viewed from the front of the carriage, the lever 362 is rocked bringing the nose 366 against the plate 361, thereby turning the rocking bar 352 about its pintles 359 and raising the limb 353 from its forward position.

When the rocking bar 352 is in this raised position, the nose 351 is also lifted, so that the styli 340 are not pushed forward in the bushes 342. The rocking bar 352 is moved into the raised position during the reverse travel of the carriage 4, so that no recording marks are made on the recording paper 104 during this reverse travel. The action is controlled by a friction drive associated with the upper drive mechanism of the carriage 4.

Referring now to Figure 29, the shaft 275 extends forward through a frame plate 366 and carries at its outer end a cup 367 secured by a nut 368. A compression spring 369 forces a rear cup 370 against the face of a disc 371 which is mounted freely on the shaft 275. The disc 371 carries a downwardly extending arm 372 which engages the operating lever 365 at its lower end. Thus, when the shaft 275 rotates in the direction corresponding to the reverse travel of the carriage 4, the rod 365 is moved to the right, as viewed from the front of the carriage, and raises the rocking bar 352.

It should be appreciated that, at the limit of its reverse travel, the carriage 4 moves to the left-hand end of the framework 2, so that the stylus 340 which is in the working path lies to the left of the display board 3. By reason only of the rocking bar actuating mechanism described, the rocking bar 352 would move forward immediately the forward movement of the carriage 4 commenced, moving forwards with it the stylus 340, the tip of which would foul the end of the display board 3. To prevent this, a cam surface 376 (Figure 33) is provided on the front face of the upper rail 59 and this engages a push button 377 located at the rear end of a flexible control cable 378, the outer sheath of which is held in a bush 379 on a plate 380 attached to the bracket 350. A compression spring 381 is inserted between the push-button 377 and a washer 382 located at the rear face of the bush 379. At the other end, the outer sheath of the control cable 378 is held in a fixed bush 383 so that the inner cable acts on the plate 361 to turn the limb 353 of the rocking bar 352 from the stylus 340. The cam surface 376 extends to the right along the framework 2 for such a distance that the rocking bar is not released until the stylus 340 is over the surface of the recording paper 103.

On the left-hand side of the casing 201, a cover 386 is hinged to the casing 201 at 387, and serves to protect the mechanism attached to the outside of the casing.

The record marks are made by passing an electric current from the limb 353 of the rocking bar 352 through the stylus 342 and through the electrolytic recording paper 103 to the conducting front surface of the display board 3. It will be recalled that the necessary current pulse is generated by an electronic circuit which is triggered when a bridge network is exactly balanced.

The triggering of the electronic circuit is related to the downward movement of the stylus 340 by gearing a balancing potentiometer, forming part of the bridge network, with the stylus chain and carriage drive mechanism. This is effected in the following manner as may be seen from Figures 20 and 23.

The balancing potentiometer which controls the electronic circuit is a rotary potentiometer 390 having its contact arm 391 fixed to the horizontal shaft 257 revolving at 100 R. P. M. Therefore in normal operation one balance point of whichever bridge, the potentiometer 390 is associated with, is reached at some point in each revolution of the potentiometer contact arm 391. Immediately to the rear of the potentiometer 390, is a small driving wheel 392 of a Maltese cross mechanism 393, providing an intermittent drive to the rotary contact 394 of a five-way sunflower distributor switch 395. This wheel 392 has a single pin 396 which co-operates with the Maltese cross wheel 393 on a parallel shaft 397, and the Maltese cross wheel 393 has five lobes so that it is rotated through one fifth of a revolution for every revolution of the potentiometer arm 391.

The moving contact 394 of the distributor sunflower switch 395 is carried by the shaft 397 and the sunflower switch has five uniformly spaced segments so that, for the whole of a single revolution of the potentiometer arm 391, the switch contact 394 rests on one of the segments, and at each revolution of the potentiometer arm 391 it is moved on to the next segment.

These switch segments are connected to five bridges of the strain gauges whose conditions are thus recorded during one vertical traverse of the stylus 340. Thus five separate records are made in five zone sections, aranged vertically one above each other, during one traverse of the stylus 340, that is, during one revolution of the sunflower switch 395 or during five revolutions of the potentiometer arm 391.

The cams 280, 281 rotate with the shaft 257 and accordingly the muting switches 283, 284 are closed once during each revolution of the potentiometer arm 391. The cams 280 and 281 are set in relation to the potentiometer arm 391 and also in relation to the stylus 340 so that the muting occurs as the potentiometer arm 391 passes between the ends of the resistance balance wire of the potentiometer 390, and as the stylus 340 passes from one zone to that below. Accordingly no record can be made on the recording paper 104 during this interval.

Figures 35, 36:
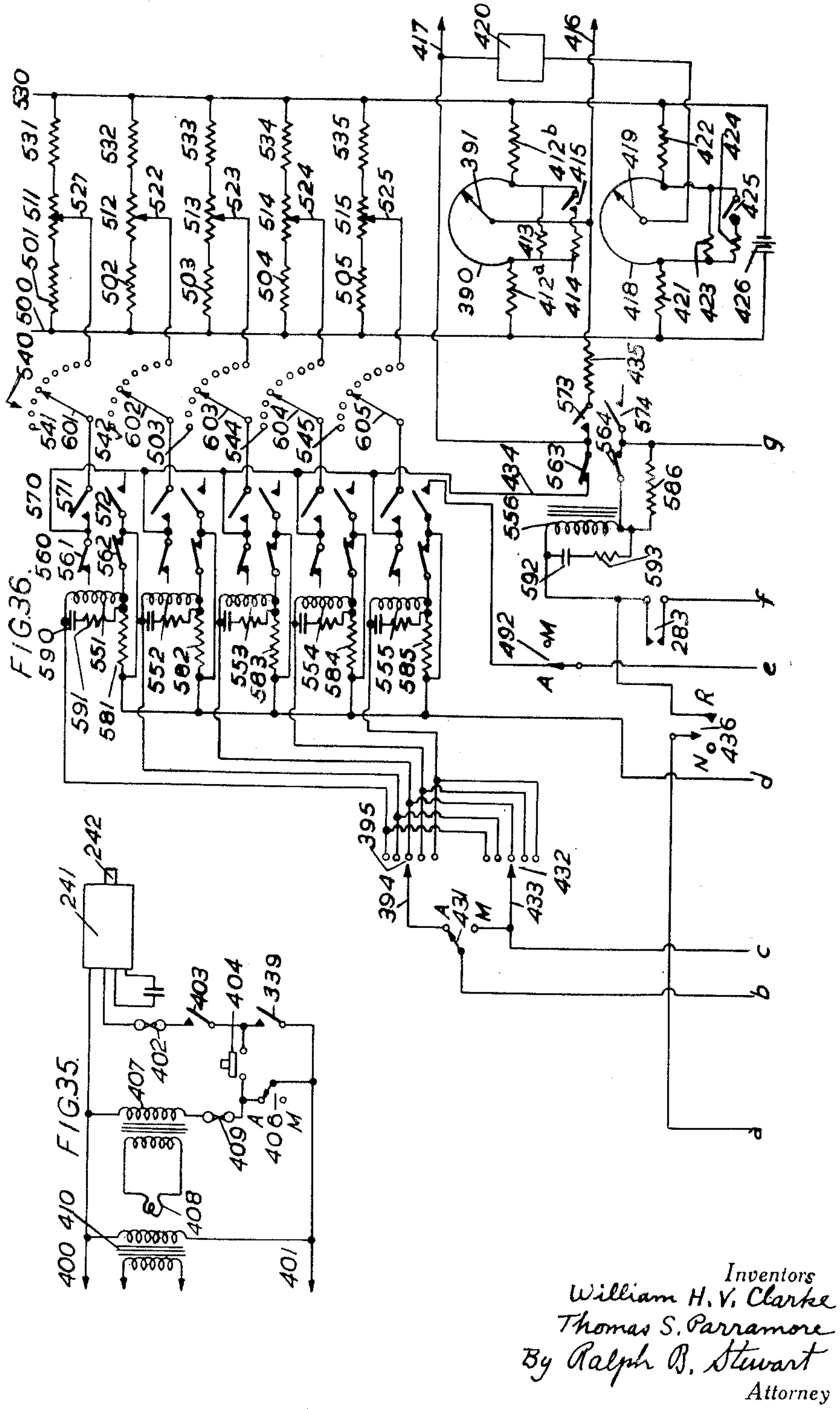
Figure 35 is a schematic diagram of the carriage driving motor control circuit.
Figure 36 is a schematic circuit diagram of the strain gauge bridges and automatic selecting switches.

Referring now to the electrical circuit diagram of Figure 35, a connection is made from one pole 400 of an alternating current supply to one end of the winding of the carriage drive motor 241. The other end of the winding is connected through a fuse 402 to an on-off switch 403, which is connected in series with a push-button switch 404 and in series with a two-way switch 406 to the other pole 401 of the alternating current supply. The push-button switch 404 is mounted on a small control panel 405 on the face of the carriage casing 201 (Figure 19), and the purpose of the switch 404 is to enable the carriage 4 to be started on its forward travel after the switch 339 has opened in the manner described at the extreme left end of the carriage travel.

The push-button switch 404 is connected in series with a two-way switch 405, having a closed position A and an open position M, in parallel with an on-off switch 338. A step-down transformer 407, having its secondary winding connected to an indicator lamp 408, is connected from the pole 400 of the alternating current supply and through a fuse 409 to the junction of the switches 404 and 406, so that the indicator lamp 408 gives an indication when the switch 406 is in circuit for automatic operation of the carriage drive.

A step-down filament transformer 410 has its primary winding connected across the alternating current supply at 400 and 401 and has its secondary winding connected to supply the filament of a marker valve 411 (Figure 23), which is mounted in the recorder carriage 4 and which operates as a amplifying valve at the end of the electronic circuit for providing a current pulse to the recorder stylus 340.

Figure 37:
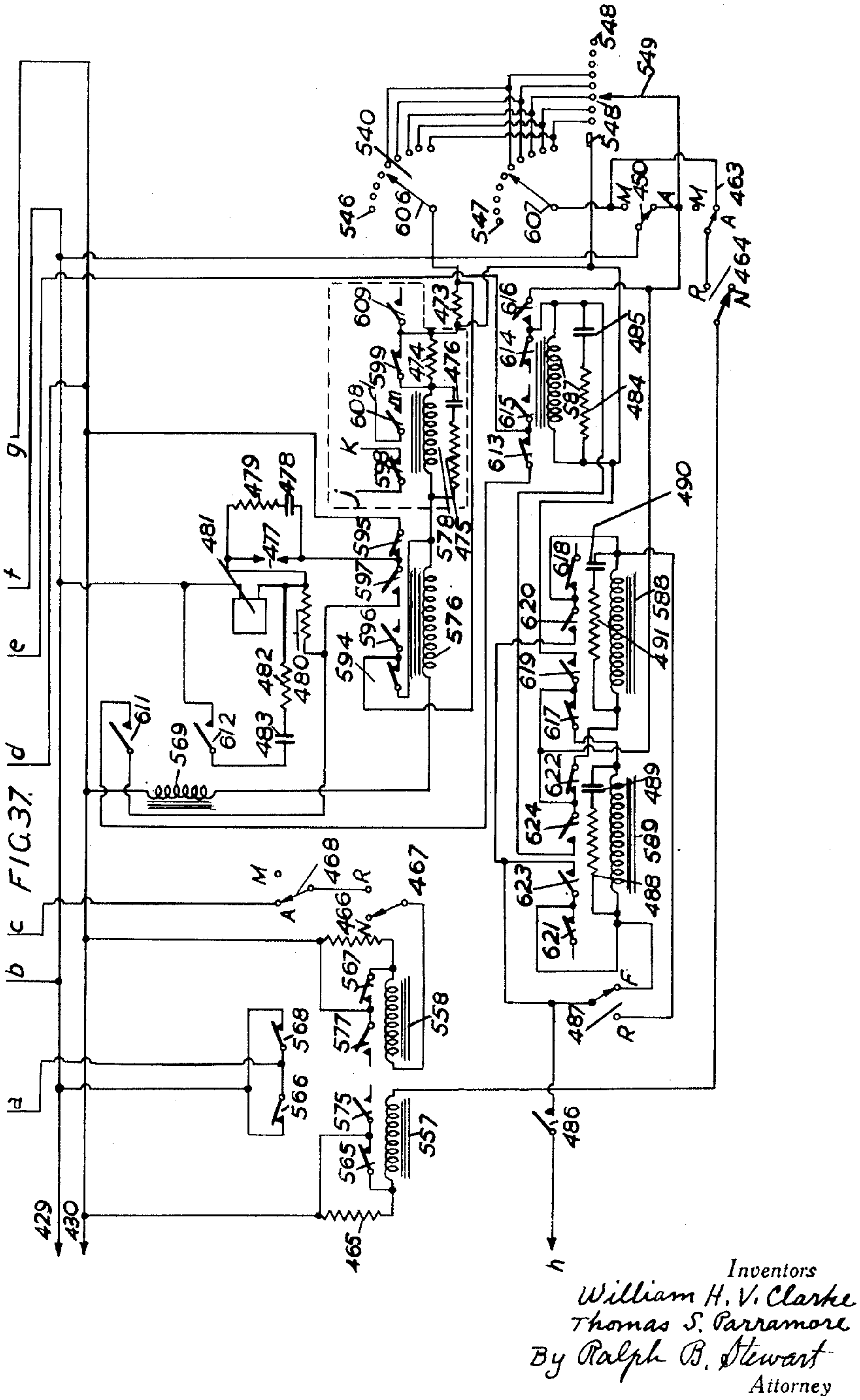
Figure 37 is a schematic circuit diagram of the control relays associated with the operation of the recorder.

Referring now to the circuit diagrams of Figures 36 and 37, the connecting wires, *a*, *b*, *c*, *d*, *e*, *f*, and *g* of Figure 36 are connected to the correspondingly lettered connecting wires of Figure 37.

A bus-bar 500 is connected to one end of all the strain gauges which are attached, in this example, to an aircraft wing under test and five such strain gauges are shown in Figure 36 at 501 to 505.

For convenience, only five strain gauges 501 to 505, which are associated with one particular vertical travel of a recording stylus 340, are shown in Figure 36. However, it will be understood that up to two hundred such strain gauges may be associated with the recorder according to this example.

The other end of the strain gauge 501 is connected to one end of the balance potentiometer 511 while the other end of the potentiometer 511 is connected through a comparison strain gauge 531, forming a second arm of a Wheatstone bridge, to a second bus-bar 530. The other strain gauges 502 to 505 are connected through balance potentiometers 512 to 515, and through comparison strain gauges 532 to 535 to the second bus-bar 530.

The sliders of the potentiometers 521 to 525 are connected to corresponding contacts on different banks 541 to 545 of a multiple bank, multiple way, step by step operating distributor switch 540 of automatic telephone type. Across the bus-bars 500 and 530 are connected the other two arms of the Wheatstone bridge, comprising a resistance 412*a* connected in series with the potentiometer 390 driven from the carriage drive and a resistance 412*b*.

The balance potentiometer 390 is bridged by a resistance 413 and also by a resistance 414 connected in series with a single pole switch 415. The moving contact 391 of the potentiometer 390 is connected through the lead 416 to the input of a bridge amplifier, the output of which is connected to the electronic circuit which provides the current impulse to the stylus 340 when the bridge is balanced.

As an alternative to the automatic balancing arrangement which includes the driven potentiometer 390, the bridge may be balanced by a manually adjusted branch of the Wheatstone bridge consisting of a resistance 421, a manually adjusted potentiometer 418 and a resistance 422 connected in series between the bus-bars 500 and 530. The potentiometer 418 is bridged by a resistance 423 and by a resistance 424 connected in series with a single pole switch 425. The slider 419 is connected through a current balance indicator 420 to the line 417. A 4 volt battery 426 is connected across the bus-bars 500 and 530 to provide the operating current for the Wheatstone bridge.

A bank of five relays 551 to 555 are associated one with each of the segments of the sunflower switch 395. One end of the winding of each of the relays 551 to 555 is connected through a resistance 581 to 585 respectively to the connection *d* which it will be seen from Figure 37 is taken to the positive pole 430 of a 250 volt D. C. supply, the negative pole of this supply being connected to a line 429.

The other ends of the windings of the relays 551 to 555 are taken each to one of the five segments of the sunflower switch 395 so that, as the segments of the sunflower switch 395 are swept by the moving contact 394, a connection is made through a two-way switch 431 having a closed position A and an open position M to the line *b* which is connected to the negative pole of the D. C. supply at 429.

Thus it will be seen that each of the relays 551 to 555 is operated in sequence according to the setting of the sunflower switch 395. A similar 5-way switch 432 is connected in parallel with the switch 395 having its five contacts connected each to one of the five contacts of the switch 395. The moving contact 433 of the switch 432 which is manually operated is connected to the line *c* and may also be connected through the switch 431 in its position M to the line *b*, and thus to the negative pole 429 of the D. C. supply, to give manual operation of the relays 551 to 555.

The relay 551 has a suppressor consisting of a condenser 590 and a resistance 591, connected in series with each other and in parallel with the relay winding. Each of the other relays 552 to 555 is provided with a similar suppressor comprising a condenser and a resistance in series which are not numbered in the drawing.

The five relays 551 to 555 have a bank of contacts, indicated generally at 560, which are normally closed and which open when each relay operates, and a second bank of contacts, indicated generally at 570, which are normally open, and which are closed by the operation of each relay.

Particularly, the relay 551 operates to open the contacts 561, 562 and to close the contacts 571, 572. The contact 562 bridges the resistance 581, which is thus cut out of circuit until the relay operates, but is connected in circuit when the relay closes. This means that the full voltage is available to close the relay 551 as quickly as possible, and the resistance 581 serves to reduce the current when the relay has been closed, reducing the voltage and therefore the heating produced, and also reducing the time of decay of the magnetic field and therefore of the releasing time of the relay, when the operating current is removed.

The corresponding contacts of the other relays 552 to 555 operate in a similar manner with respect to the resistances 582 to 585 respectively.

The contacts 571 are connected to the wiping arm 601 of the bank 541 of the distributor switch 540, and, when the relay 551 is operated, connects the wiping arm 601 to the line 434.

The corresponding contacts of the relays 552 to 555 serve in like manner with respect to the wiping arms 602 to 605 of the banks 542 to 545 of the same distributor switch 540.

A relay 556 has one end of its winding connected through a resistance 586 to the line *g* which is connected to the positive pole of the D. C. supply at 430. The other end of the solenoid winding is connected through the muting switch contacts 283, which are closed by the cam 280 once in each revolution of the shaft 257, and thence to the line *f*, which is connected to the negative pole of the D. C. supply at 429. A relay suppressor, consisting of a condenser 592 and a resistance 593 in series, is connected across the winding of the relay 556. This relay has two pairs of contacts 563 and 564, which are normally closed, and two pairs of contacts 573 and 574, which are normally open and which are closed when the relay 556 is operated.

The line 434 from the contacts of relays 551 to 555, is connected through the contacts 563 to the line 417, which is connected to one side of the current detector 420 and is also connected to the opposite input terminal of the amplifier to that to which the line 416 is connected. Thus, when the muting switch 283 is closed between each operation of the switch 394, the relay 556 is operated and the line 434 is disconnected from the amplifier input, while a resistance 435, having one end connected to the line 416, is connected across the amplifier input by the closure of the contacts 573.

The junction of the winding of relay 556 and the switch 283 is connected through a switch 436 to the line *a*. The switch 436 has an open position at N and a closed position at R, the purpose of which is explained later.

As shown in Figure 37, a further bank of contacts 546 of the distributor switch 540 are connected to a series of insulated segments 548 mounted on the framework 2 and corresponding in number to the recording sections into which the recording paper 164 is divided longitudinally. A wiping contact 549 mounted on the carriage 4, sweeps over the segments as the carriage 4 moves along the framework 2. Each of the segments 548 is 3″ long, corresponding to the longitudinal length of each of the recording sections so that, in any position of the recorder carriage 4, the moving contact 549 makes contact with one of the segments 548 according to the position of the recorder carriage 4. The object of the segments 548 is to provide a check for the position of the selector arms 601—605 to ensure that the group of strain gauges selected by the distributor switch 540 corresponds at all times to the group associated with a particular vertical travel of the stylus 340 and the corresponding position of the recorder carriage 4.

A manually operated switch 607 has a bank of contacts 547 connected in parallel with the corresponding contacts of the bank 546, so that any one of these contacts may be selected manually. The moving contact of the switch 607 is connected to one side of a change-over switch 459 corresponding to a setting M of that switch. The other side of the change-over switch 459 corresponding to the alternative setting A, is connected to the sweeping contact 549, while the moving contact of the switch 459 is connected to the negative pole of the D. C. supply at 429. Thus, with the switch 459 set in the position M, any one of the contacts of the bank 546 may be selected by the contact 607 as an alternative to the selection by the sweeping contact 549 on the recorder carriage 4.

The contact corresponding to position M of the switch 459 is connected to a switch 463 which is closed in the position A and open in the position M. The other side of the switch 463 is connected to one side of a switch 464 which is closed in the position R and is open in the alternative position N. The other side of the switch 464 is connected through the winding of a relay 557 and a resistance 465 to the positive pole of the D. C. supply at 430.

The relay 557 has two pairs of contacts 565 and 566, which are normally closed, and one pair of contacts 575 which are normally open and which are closed when the relay 557 operates. The contacts 565 are connected across a resistance 465. A relay 558 has one end of its solenoid winding connected through a resistance 466 to the positive pole of the D. C. supply at 430. The other end of the solenoid winding is connected to the one side of a switch 467 which is closed in the position R and which is open in the position N. The other side of the switch 467 is connected to one side of a switch 468 which is closed in the position A and which is open in the position M. The other side of the switch 468 is connected to the line *c*.

The relay 558 has two pairs of contacts 567, 568 which are normally closed and two pairs of contacts 577 and 578 which are normally open, but which are closed when the relay 558 operates. The contacts 567 are connected across the resistance 466.

The contacts 566, of relay 557 and the contacts 568 of relay 558 are connected in parallel.

The contacts 566 and the contacts 568 connect the negative pole of the D. C. supply at 429 to the line *a*, when either pair of contacts 566 or 568 are closed.

A relay 576 has two pairs of contacts 594, 595, which are normally closed, and two pairs of contacts 596 and 597 which are normally open, and which are closed when the relay 576 operates. A relay 578 has two pairs of contacts 598 and 599, which are normally closed, and two pairs of contacts 608, 609 which are normally open, and which are closed when the relay 578 operates. A relay 569 has two pairs of contacts 611 and 612 which are normally open and which are closed when the relay 569 operates. A relay 587 has two pairs of contacts 613, 614, which are normally closed, and two pairs of contacts 615, 616, which are normally open and which are closed when the relay 587 operates. A relay 588 has two pairs of contacts 617, 618, which are normally closed, and two pairs of contacts 619, 620 which are normally open, and which are closed when the relay 588 operates. A relay 589 has two pairs of contacts 621, 622, which are normally closed, and two pairs of contacts 623, 624, which are normally open and which are closed when the relay 589 operates.

The moving contact 606 of the switch bank 549 is connected to the junction between the contacts 594 and 596 of relay 576. The moving contact 606 is also connected through a resistance 473 and through a resistance 474 to one end of the solenoid winding of the relay 578. This solenoid winding is connected in series with the winding of the relay 576 and the winding of the relay 569 to the positive pole of the D. C. supply at 430.

A suppressor consisting of a resistance 475 and a condenser 476 is connected across the winding of the relay 578. The contacts 599 are connected across the resistance 474. The junction of the contacts 599 and 609 is connected to the junction of the resistances 473 and 474, and the contacts 598 are connected across the lines *j* and *k* which are connected to an alarm, not shown in the circuit diagram, which is operated when the position of the carriage 4 is out of step with the setting of the selector switch 540. The contacts 608 are connected across the lines *l* and *m* which are connected to cut out the recorder spot under the same conditions.

The junction of the contacts 597, 595 of the relay 576 is connected to one of the contacts 477, which are the driving contacts for the selector switch 540. The contacts 477 are bridged by a suppressor comprising a condenser 478 and a resistance 479 in series. The other contact 477 is connected to the junction of the switch coil 481 of the selector switch 540 and a resistance 482 through a resistance 480, which is connected to one of the contacts 597 and to one of the contacts 611 of the relay 569. The other contact 611 is connected to one of the contacts 613 of relay 587 and the junction of the contacts 613 and 615 is connected to the line *e*. The switch coil 481 of the selector switch 540 is connected at one side to the negative pole of the D. C. supply at 429, and is bridged by a suppressor consisting of the resistance 482 and a condenser 483, connected in series with the contact 612 of the relay 569.

The junction of the resistances 473 and 474 is connected also to the strapped segments 548' of the insulated segments 548 running the length of the recorder frame 2 and is connected also to one of the contacts 619 of the relay 588 and to one side of the winding of the relay 587. The other side of the winding of the relay 587 is connected to one of the contacts 624 of the relay 589, and the winding is bridged by a suppressor comprising a resistance 484 and a condenser 485.

One of the contacts 623 of relay 588 is connected to one of the contacts 620 of the relay 588, to one side of the on/off switch 486 and to the moving contact of a two-way switch 487 having a position R and a position F. The other side of the on/off switch 486 is connected to the line *h*, which is connected to the positive pole of the D. C. supply at 430. The contact of the switch 487 in the position F is connected to the junction of the contacts 621 and 623 of the relay 589 and to one end of the winding of the same relay.

The other end of the winding is connected on one of the contacts 617 of the relay 588. The winding of the relay 589 is bridged by a suppressor consisting of a resistance 488 and a condenser 489. The contact of the switch 487 in the position R is connected to one end of the winding of the relay 588, the other end of which is connected to one of the contacts 622 of relay 589. The other end of the winding of the relay 588 which is connected to the switch 487, is also connected to the junction of the contacts 618 and 620, the junction of the contacts 622 and 624 of relay 589 and the junction of the contacts 617 and 619 of relay 588 are connected to one of the contacts 616 of relay 587, and to the contact of the switch 450 which, in the position A of that switch, is connected to the negative pole of the D. C. supply at 429.

As shown in Figure 36, the line *e* is connected through a two-way switch 492, having an open position at M and a closed position at A, to one of the normally open contacts of the relay 555.

The switch 406 of Figure 35, the switches 431 and 492 of Figure 36, and the switches 468, 450 and 463 of Figure 37 are ganged together. When they are set in the positions A, the recorder is switched for automatic operation so that, as the carriage 4 moves over the display board 3, the selector switch 540 is automatically stepped round to the position corresponding to the position of the recorder carriage 4 at any time, as determined by the contact 549 with the segments 548.

When, however, the switches enumerated above are set to the position M, the recorder is switched for manual operation, which allows any group of five strain gauges to be selected by the manually operated switch arm 607, and any particular strain gauge of the five, to be selected by the manually operated switch-arm 433.

The switches 464, 436 and 467, are also ganged, so that when they are set in the position shown at N the recorder is switched for normal operation as already described. When, however, they are set to the position R, the recorder is switched to repeat the reading of a particular strain gauge.

The switch 487 is operated by the drag link 365 as shown in Figure 23, so that the switch 487 is moved to the position F during the forward travel of the recorder carriage 4, and is switched to the position R during the reverse travel of the recorder carriage 4.

Figure 34:
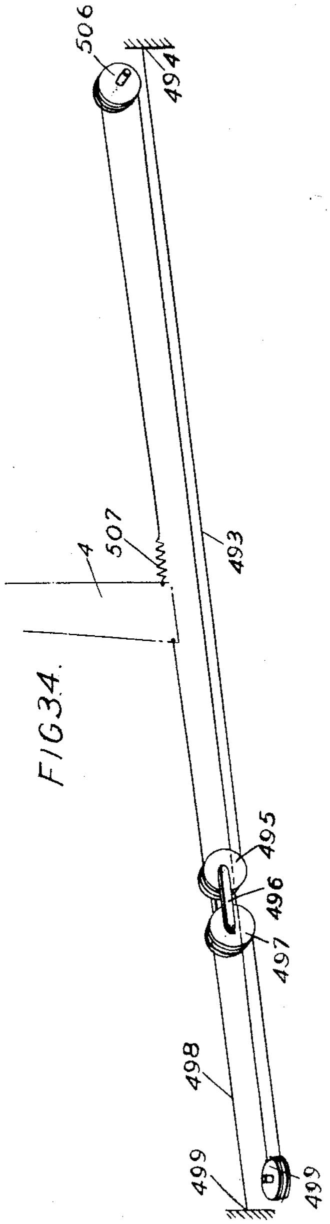
Figure 34 is a diagrammatic perspective view of the cable laying pulleys.

The balancing potentiometers 511 to 515 and the corresponding balancing potentiometers of all the other strain gauge bridge arms are located in the control cabinet 1 and flexible connecting cables from the cabinet 1 and from the A. C. and D. C. supplies are carried to the recorder carriage 4 in the cable conduit 36. In Figure 34, the recorder carriage 4 is shown diagrammetrically in broken lines and the flexible connecting cables are shown diagrammetrically by the line 493, all of the cables being secured at the right hand end of the cable conduit 36 at 494. A broad flanged pulley 495, over which the flexible cables 493 pass, is coupled by a link 496 to a narrower flanged pulley 497, and the pulleys 495 and 497 lie in the cable conduit 36. A flexible wire cable 498, anchored at 499 at the extreme left-hand end of the cable conduit 36, passes over the pulley 497 and then returns to the left-hand end of the cable conduit 36, where it passes round a pulley 499 mounted with its axis vertically. From the pulley 499, the cable 498 runs along the cable conduit 36 to the right-hand end, where it passes over a pulley 506 mounted with its axis horizontally and thence to a tension spring 507 secured to the right-hand side of the recorder carriage 4.

By reason of the pulley arrangement described, it will be appreciated that the pulleys 495, 497 move with the carriage 4 in the same direction but at half the speed, and, on the return travel, serve to lay the cables progressively in the cable conduit 36 so that kinking and undue wear on the cables 493 is avoided.

We claim:

1. In an instrument for recording the magnitudes of physical quantities derived from a plurality of test devices, the combination of an elongated record surface having separate longitudinal sections thereof assigned to said devices, a recording stylus, means mounting said stylus to repeatedly traverse said recording surface transversely thereof, driving means producing relative movement between said recording surface and said stylus longitudinally of said surface in repeated cycles and at such rate that successive traverses of said stylus occur in separate longitudinal sections thereof assigned to different test devices, switching means operating in timed relation with the relative movement between said stylus and said surface for connecting said stylus to the test device corresponding to the particular section over which said stylus is moving, means controlled by each test device when connected to said stylus for marking said record surface at a point in each traverse corresponding to the magnitude of the physical quantity derived from the test device, and means for shifting said record surface lengthwise thereof, after each lengthwise traverse, a distance equal to a small fraction of the length of a section of said surface, whereby marks produced in each section on successive cycles are spaced from each other by said distance.

2. A recording instrument according to claim 1 in which the stylus is mounted on a carriage which is driven forward by said driving means continuously along the recording surface during a recording operation and in which the stylus traversing means moves the stylus with a component of motion equal and opposite to the forward motion of the carriage, so that the resultant direction of the stylus movement is perpendicular to the direction of the carriage movement.

3. A recording instrument according to claim 1 in which said stylus mounting means comprises an endless chain supporting said stylus at a point thereon, and including a number of additional styli mounted upon said chain at spaced points so that as one stylus completes its traverse of the recording surface the adjacent stylus commences its traverse.

4. A recording instrument according to claim 1 and including means for supporting said recording surface in a stationary position during recording operations, and means for shifting said recording surface longitudinally thereof between successive recording operations, said shifting movement being limited to a distance less than the length of longitudinal section of said recording surface.

5. A recording instrument according to claim 4 and including a scale and an index cooperating therewith for indicating the position of the recording surface between the limits of each longitudinal adjustment.

6. A recording instrument according to claim 5 and including a mechanical motion magnifying device having said index mounted on the fast moving element thereto and a flexible metal tape connecting the slow moving element thereof to said shiftable recording surface.

7. A recording instrument according to claim 1 in which said stylus mounting means comprises and endless chain formed of links joined together by hollow rivets, said stylus being mounted within one of said hollow rivets and an insulating bushing for supporting said stylus within said rivet for sliding movement axially thereof, and a conducting pressure plate arranged adjacent to the path of travel of said stylus for applying pressure to the head of said stylus during its traverse of the recording surface.

8. A recording instrument according to claim 7 wherein said stylus is provided with a magnetic head, and including a magnet arranged adjacent to the path of travel of said stylus and positioned at a point where said stylus moves off of said recording surface and being operative to withdraw said stylus from its recording position, and a ramp arranged adjacent to the path of travel of said stylus at a point in advance of the point where the stylus first engages said recording surface for moving said stylus forward into its recording position.

9. A recording instrument according to claim 1 and including an alarm, an energizing circuit for said alarm and means controlled jointly by said switching means and by the relative movement between said recording surface and said stylus for energizing said alarm when said stylus traverses a section of said surface which is not assigned to the test device connected to said stylus.

10. A recording instrument according to claim 1 in which said recording surface is divided into a plurality of horizontally extending zones, each zone being divided into longitudinal sections assigned to individual test devices, said stylus traversing means being arranged to move the stylus across all of said zones on each traverse thereof, and including second switching means operated in timed relation with the traversing movement of said stylus for connecting said stylus to different test devices while traversing different zones.

11. A recording instrument comprising a stationary, elongated framework, an elongated display board mounted on the framework and adapted to receive an elongated sheet of chart material to provide a recording surface, a carriage mounted on the framework for movement from one end to the other thereof, driving means moving said carriage continuously along the length of the recording surface, a stylus carried by said carriage and mounted to be moved perpendicularly to the direction of the carriage movement, and means for shifting said display board with respect to said framework along the length thereof over a range of movement equal to only a fraction of the length of said board.

12. In an instrument for recording the magnitudes of variable physical quantities derived from a multiplicity of test devices, the combination of an elongated record surface divided transversely into a plurality of zones, each zone extending throughout the effective length of said record surface and each zone being divided longitudinally into sections of equal length, the sections in different zones being arranged in rows transversely of said zones, and a test device being assigned to each section, a recording stylus, mounting means for said stylus, driving means for producing relative motion between said mounting means and said record surface in a direction parallel with the length of said record surface, second driving means for moving said stylus relative to said mounting means to produce a succession of traversing movements across the width of said record surface, said traversing movements being equally spaced from one another along the length of said record surface so that successive traverses are located in different transverse rows of sections of said record surface, selector means operating in timed relationship with said traversing movements and being operative during the course of its traverse across each of said sections of each of said zones to connect said stylus to the particular test device assigned to the section being traversed, and means responsive to each test device for causing said stylus to make a record mark on said record surface at a point along its traverse across each of said sections of each of said zones, corresponding to the magnitude of the physical quantity derived from the test device.

13. In an instrument for recording the magnitudes of variable physical quantities derived from a multiplicity of test devices, the combination of an elongated stationary record surface, said record surface being divided transversely into a plurality of longitudinally extending zones and a plurality of laterally extending rows of sections, each section of each zone being allocated to a separate test device, a carriage, guide means for said carriage extending along the length of said surface, means for driving said carriage along said guide means at a constant speed, a plurality of recording styluses carried by said carriage, means for driving said styluses relative to said carriage to produce successive traverses of consecutive styluses across the width of said record surface, said successive traverses lying in successive rows of sections of said record surface and crossing each of said zones, switching means for connecting each of said styluses to the respective test device to which each section of each zone is allocated during the period when said stylus is crossing said section, and means controlled by each test device when connected to said stylus for energising the stylus at a point in its traverse across each of said zones corresponding to the magnitude of the physical quantity derived from the test device.

14. The method of recording upon an elongated record surface the magnitudes of physical quantities derived from a plurality of test devices which consists in sampling the response of said devices in succession and in repeated cycles, recording each response as it is sampled in each cycle by marking said record surface at a point displaced transversely from a longitudinal reference axis a distance proportional to the magnitude of each response, spacing successive recording marks made in each cycle along the length of said surface by a distance equal to the effective length of the record surface divided by the number of test devices, and spacing the marks made in each cycle with respect to the marks made in the preceding cycle by a distance along the length of said surface equal to a small fraction of said distance between successive marks.

WILLIAM HERBERT VICTOR CLARKE.
THOMAS STUART PARRAMORE.

REFERENCES CITED

The following references are of record in the file of this patent:

UNITED STATES PATENTS

| Number | Name | Date |
|---|---|---|
| 2,296,274 | Finch | Sept. 22, 1942 |
| 2,387,760 | Keinath | Oct. 30, 1945 |
| 2,391,601 | Thomas et al. | Dec. 25, 1946 |
| 2,392,916 | Gruss | Jan. 15, 1946 |
| 2,395,351 | Sohn | Feb. 19, 1946 |
| 2,401,019 | Rieber | May 28, 1946 |
| 2,408,035 | Benioff | Sept. 24, 1946 |
| 2,424,118 | Rast | July 15, 1947 |
| 2,428,129 | Smith | Sept. 30, 1947 |
| 2,437,242 | Cole et al. | Mar. 9, 1948 |
| 2,443,647 | Waterman | June 22, 1948 |
| 2,457,131 | Curtis | Dec. 28, 1948 |
| 2,459,521 | Greig | Jan. 18, 1949 |
| 2,477,062 | Jacobi | July 26, 1949 |